(12) United States Patent
Kumagai et al.

(10) Patent No.: US 12,017,669 B2
(45) Date of Patent: Jun. 25, 2024

(54) DRIVING FORCE CONTROL SYSTEM FOR VEHICLE

(71) Applicant: TOYOTA JIDOSHA KABUSHIKI KAISHA, Toyota (JP)

(72) Inventors: Kuninori Kumagai, Sunto-gun (JP); Satoshi Yamanaka, Gotemba (JP); Hiromitsu Metsugi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 17/585,102

(22) Filed: Jan. 26, 2022

(65) Prior Publication Data

US 2022/0274615 A1   Sep. 1, 2022

(30) Foreign Application Priority Data

Feb. 26, 2021   (JP) ................. 2021-029951

(51) Int. Cl.
*B60W 50/10* (2012.01)
*B60W 20/40* (2016.01)
*B60W 30/182* (2020.01)
*B60W 40/09* (2012.01)

(52) U.S. Cl.
CPC ............ *B60W 50/10* (2013.01); *B60W 20/40* (2013.01); *B60W 30/182* (2013.01); *B60W 40/09* (2013.01); *B60W 2710/081* (2013.01)

(58) Field of Classification Search
CPC .. B60L 15/20; B60L 15/2018; B60L 2240/12; B60L 2240/16; B60L 2240/642; B60L 2250/26; B60W 20/40; B60W 30/182; B60W 40/09; B60W 50/10; B60W 2050/0024; B60W 2520/10; B60W 2552/15; B60W 2710/081; F02D 2200/1002; F02D 2250/18

See application file for complete search history.

(56) References Cited

U.S. PATENT DOCUMENTS

| | | | |
|---|---|---|---|
| 2009/0048751 A1* | 2/2009 | Nakai | B60W 10/06 701/70 |
| 2012/0296541 A1* | 11/2012 | Matsushita | B60W 50/06 701/70 |
| 2016/0281621 A1* | 9/2016 | Nakade | F02D 29/02 |

FOREIGN PATENT DOCUMENTS

| | | | |
|---|---|---|---|
| DE | 10 2011 103 604 A1 | | 2/2012 |
| JP | 2004-276669 A | | 10/2004 |
| JP | 2007155643 A | * | 6/2007 |
| JP | 2007248160 A | * | 9/2007 |
| JP | 2008055994 A | * | 3/2008 |

(Continued)

OTHER PUBLICATIONS

Machine translation of JP2007155643A (Year: 2007).*
Machine translation of JP2008055994A (Year: 2008).*

*Primary Examiner* — Navid Z. Mehdizadeh
*Assistant Examiner* — Caitlin R McCleary
(74) *Attorney, Agent, or Firm* — Oliff PLC

(57) ABSTRACT

A drive force control system controls acceleration of a vehicle accurately in line with an operation of an accelerator pedal to improve an acceleration feel. A controller calculates a corrected target acceleration when a required acceleration is large and an operating speed of the accelerator pedal is fast, and converts the corrected target acceleration into a target driving force to propel the vehicle so as to achieve the corrected target acceleration by generating the target driving force.

3 Claims, 21 Drawing Sheets

(56) References Cited

FOREIGN PATENT DOCUMENTS

| | | | |
|---|---|---|---|
| JP | 2010285139 A | * | 12/2010 |
| JP | 2011-148342 A | | 8/2011 |
| JP | 5974916 B2 | * | 8/2016 |
| WO | 2011/089468 A1 | | 7/2011 |

* cited by examiner

FIG. 9
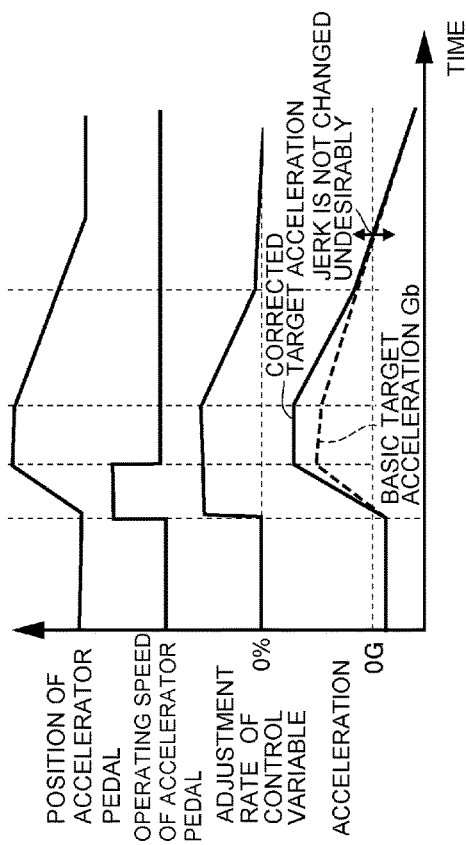
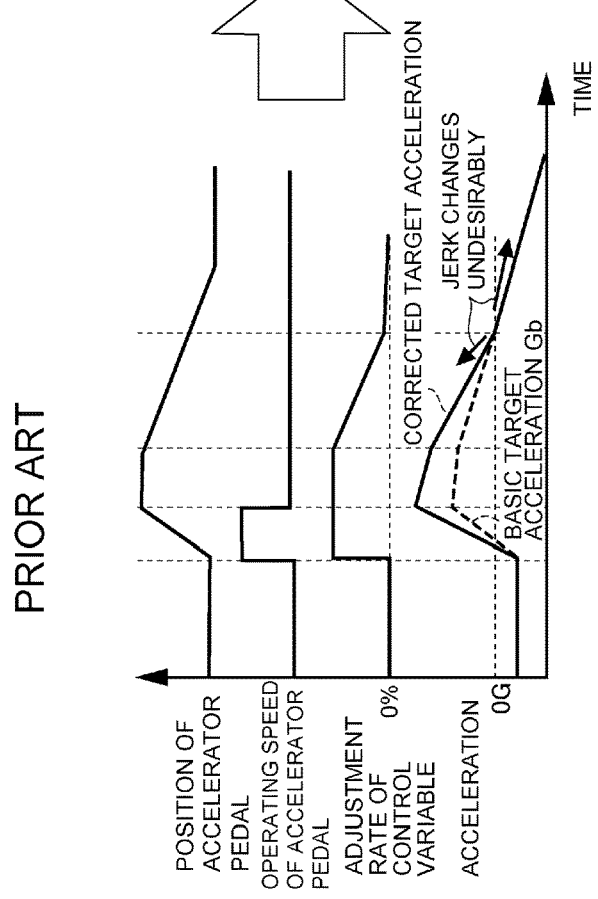

FIG. 10
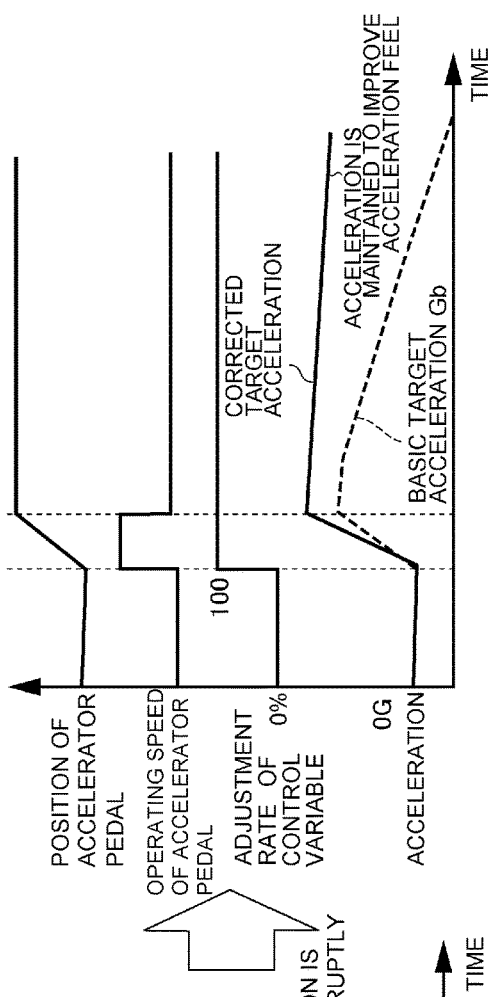
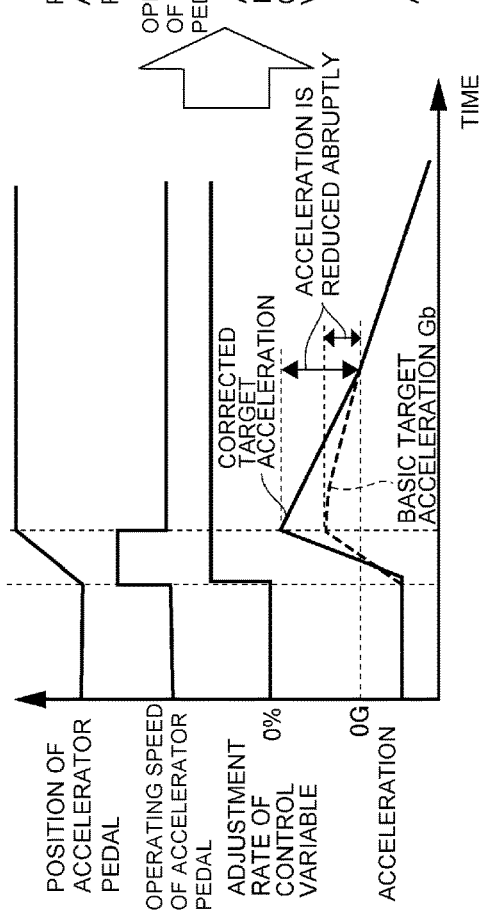

FIG. 21
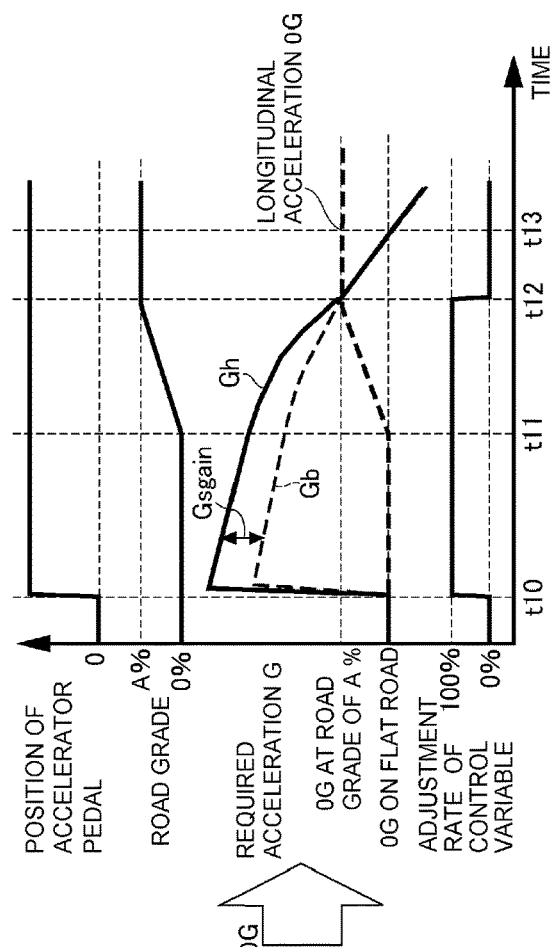
PRIOR ART
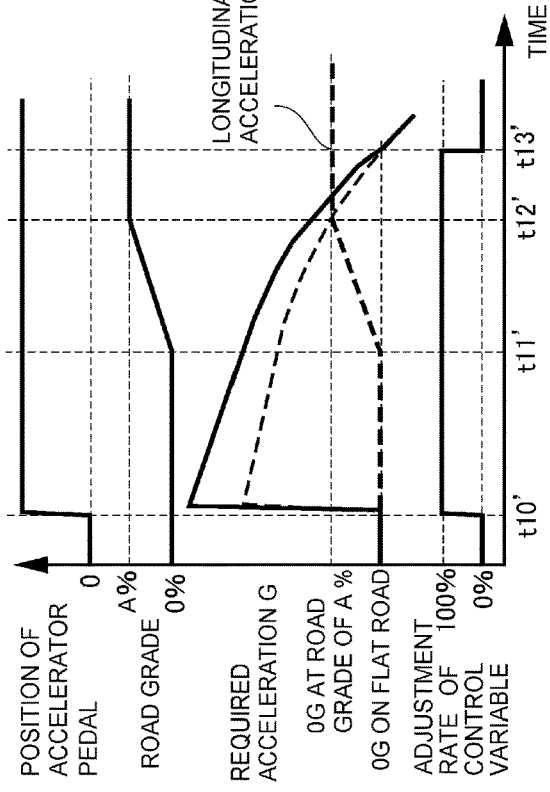
EMBODIMENT

DRIVING FORCE CONTROL SYSTEM FOR VEHICLE

CROSS REFERENCE TO RELATED APPLICATIONS

The present disclosure claims the benefit of Japanese Patent Application No. 2021-029951 filed on Feb. 26, 2021 with the Japanese Patent Office.

BACKGROUND

Field of the Disclosure

Embodiments of the present disclosure relate to the art of a control system for a vehicle that controls a driving force to propel the vehicle based on an operation of an acceleration pedal.

Discussion of the Related Art

JP-A-2011-148342 describes a vehicle control system that corrects a target acceleration calculated based on an operation of an accelerator pedal so as to achieve a desired acceleration. According to the teachings of JP-A-2011-148342, the target acceleration is multiplied by a gain greater than 1 when an operating speed of the accelerator pedal is faster than a predetermined value. The target acceleration thus corrected is reduced with a reduction in a depression of the accelerator pedal, and returned to an initial value when the acceleration is reduced to zero. To this end, a map determining the gain in accordance with an operating speed of the accelerator pedal stored in an ECU.

JP-A-2004-276669 describes a driving force control system of vehicle that reduces a delay in an actual vehicle speed with respect to an operation of an accelerator pedal. To this end, according to the teachings of JP-A-2004-276669, a target acceleration is determined based on an operation speed of the accelerator pedal, and a target vehicle speed is determined based on the target acceleration. A driving force is controlled in such a manner as to achieve the target speed thus determined so that a delay in the actual vehicle speed with respect to the operation of an accelerator pedal is reduced.

As described, according to the teachings of JP-A-2011-148342, the target acceleration is corrected by the gain to achieve a desired acceleration when the accelerator pedal is depressed fast to accelerate the vehicle abruptly. However, according to the teachings of JP-A-2011-148342, the target acceleration is determined uniformly based on a position of the accelerator pedal and the vehicle speed. Therefore, when the accelerator pedal is depressed abruptly, the desired acceleration may not be assessed accurately and hence an actual acceleration achieved by depressing the accelerator pedal abruptly would be different from the corrected acceleration. In addition, the corrected target acceleration is reduced to an initial value when the acceleration is reduced to zero. That is, a jerk of the acceleration would be changed within an acceleration range around zero as a result of shifting from the corrected target acceleration to the normal target acceleration. Specifically, the acceleration falls within the range around zero when the vehicle cruises, and in this situation, the accelerator pedal is operated frequently. Consequently, the acceleration would be changed stepwise and hence a driver may feel uncomfortable feelings. Thus, if the jerk is changed within the acceleration range where the accelerator pedal is operated frequently, the acceleration of the vehicle may not be changed accurately in response to an operation of the accelerator pedal. Such technical problem may also occur in the vehicle described in JP-A-2004-276669.

SUMMARY

Aspects of the present disclosure have been conceived noting the foregoing technical problems, and it is therefore an object of the present disclosure to provide a driving force control system that controls acceleration of a vehicle accurately in line with an operation of an accelerator pedal to improve an acceleration feel.

The driving force control system according to the exemplary embodiment of the present disclosure is applied to a vehicle that is propelled by operating an accelerator pedal. The driving force control system comprises a controller that calculates a required acceleration, and that transmits the calculated required acceleration in the form of command signal. In order to achieve the above-explained objective, according to the exemplary embodiment of the present disclosure, the controller is configured to: calculate a basic target acceleration based on a position of the accelerator pedal and a speed of the vehicle; calculate a corrected target acceleration to increase the basic target acceleration when the required acceleration is greater than a predetermined value and an operating speed of the accelerator pedal is faster than a predetermined speed; and converts the corrected target acceleration into a target driving force to propel the vehicle so as to achieve the corrected target acceleration by generating the target driving force.

In a non-limiting embodiment, the corrected target acceleration may be calculated by adding an acceleration enrichment value to the basic target acceleration. The acceleration enrichment value may be calculated by multiplying a difference between the basic target acceleration and an intended acceleration required by a driver, by a predetermined control gain. The intended acceleration may be calculated based on the position of the accelerator pedal, the speed of the vehicle, and an operating speed of the accelerator pedal.

In a non-limiting embodiment, the control gain may be determined based on the required acceleration and the speed of the vehicle. In addition, the controller may be further configured to: increase the control gain to a maximum gain when the required acceleration is greater than the predetermined value and the operating speed of the accelerator pedal is faster than the predetermined speed; and reduce the control gain to a minimum gain when the required acceleration is reduced to the basic target acceleration.

In a non-limiting embodiment, the control gain may be changed continuously with a change in the required acceleration if the required acceleration is greater than the basic target acceleration but less than the predetermined value.

In a non-limiting embodiment, the controller may be further configured to reduce the control gain in accordance with a reduction in depression of the accelerator pedal thereby reducing the corrected target acceleration to the basic target acceleration before the required acceleration is reduced to zero.

In a non-limiting embodiment, the controller may be further configured to: obtain a road grade; calculate the required acceleration based on the position of the accelerator pedal, the speed of the vehicle, and the road grade; and calculate the acceleration enrichment value by multiplying a difference between the basic target acceleration and the intended acceleration calculated further based on the road grade, by the predetermined control gain.

In a non-limiting embodiment, the controller may be further configured to reduce the acceleration enrichment value such that the corrected target acceleration is reduced to the basic target acceleration at a greater magnitude of the required acceleration decreasing while the accelerator pedal is maintained to a predetermined position when travelling uphill whose road grade is steeper than a predetermined road grade, compared to a case of travelling on a flat road.

Thus, according to the exemplary embodiment of the present disclosure, the driving force control system is configured to execute an acceleration enrichment control when the required acceleration is greater than a predetermined value and an operating speed of the accelerator pedal is faster than a predetermined speed. Specifically, the control system calculates the corrected target acceleration by adding the acceleration enrichment value to the basic target acceleration, and converts the corrected target acceleration into the target driving force to propel the vehicle so as to achieve the corrected target acceleration by generating the target driving force. According to the exemplary embodiment of the present disclosure, therefore, the acceleration of the vehicle can be controlled accurately in line with the driver's intention.

In addition, according to the exemplary embodiment of the present disclosure, the corrected target acceleration is reduced to the basic target acceleration to terminate the acceleration enrichment control, before the required acceleration is reduced to zero. According to the exemplary embodiment of the present disclosure, therefore, a jerk of the acceleration will not be changed when the required acceleration decreases close to zero. For this reason, the driver will not be urged to operate the accelerator pedal unnecessarily to stabilize the acceleration, when the acceleration enrichment control is terminated and the vehicle starts coasting.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 9 shows a comparison of termination timings of the acceleration enrichment control between the prior art and one example of the present disclosure;

FIG. 10 shows a comparison of reduction rates of increased acceleration between the prior art and the exemplary embodiment of the present disclosure;

FIG. 21 shows a comparison of termination timings of the acceleration enrichment control between the prior art and another example of the present disclosure.

DETAILED DESCRIPTION

Embodiments of the present disclosure will now be explained with reference to the accompanying drawings. Note that the embodiments shown below are merely examples the present disclosure, and do not limit the present disclosure.

The driving force control system according to the embodiment of the present disclosure is applied to vehicles having at least one of a motor and an engine serving as a prime mover. For example, the driving force control system according to the embodiment of the present disclosure may be applied to an electric vehicle in which only a motor serves as the prime mover, and a hybrid vehicle in which a prime mover includes an engine and a motor. The electric vehicle includes a battery electric vehicle in which only a motor is employed as a prime mover, and a range extender electric vehicle in which an engine is operated only to generate electricity. In addition, the driving force control system may also be applied to a plug-in electric vehicle, a plug-in hybrid vehicle, and a fuel-cell vehicle.

Figure 1:
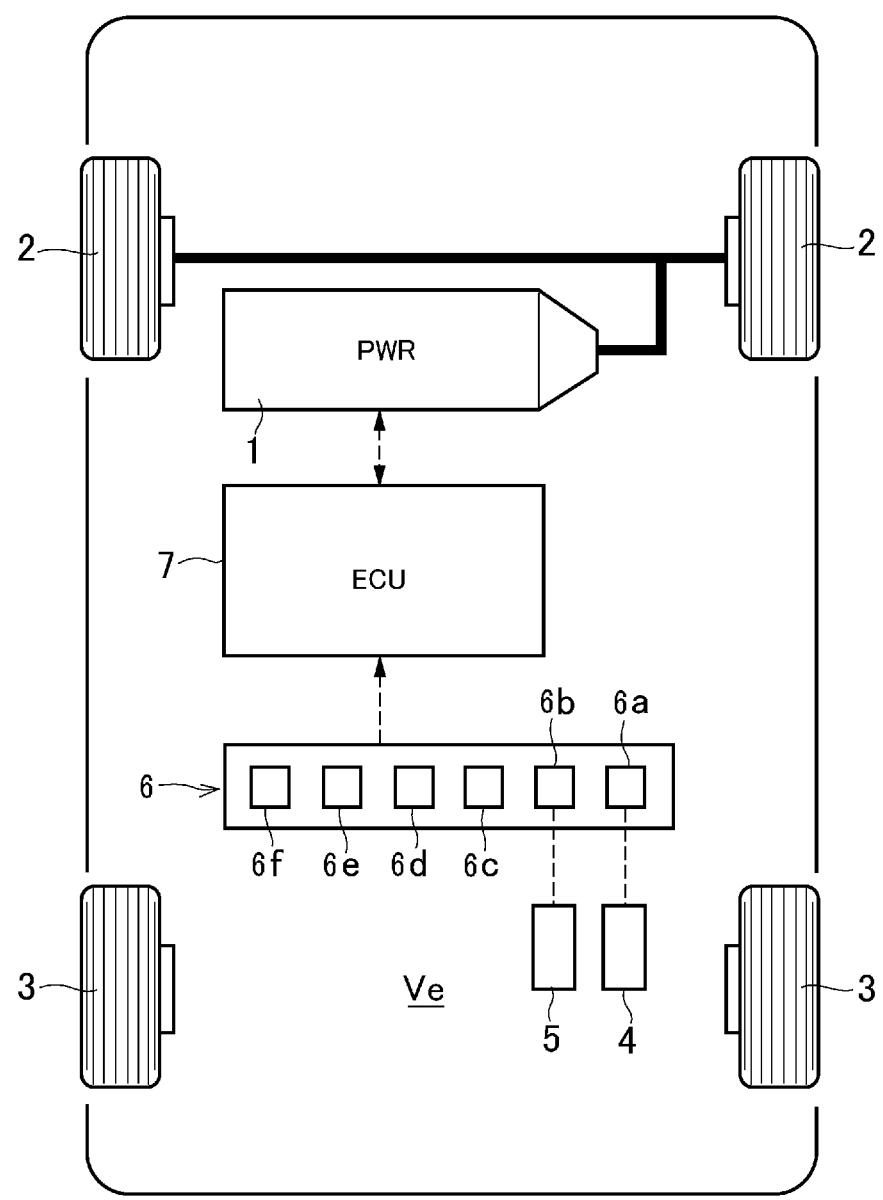
FIG. 1 is a schematic illustration showing one example of a structure of a vehicle to which the control system according to the embodiment of the present disclosure is applied.

Referring now to FIG. 1, there is shown one example of a drive system and a control system of a vehicle Ve to which the driving force control system according to the exemplary embodiment of the present disclosure is applied. The vehicle Ve comprises a prime mover (referred to as "PWR" in FIG. 1) 1, a pair of front wheels 2, a pair of rear wheels 3, an accelerator pedal 4, a brake pedal 5, a detector 6, and an electronic control unit (to be abbreviated as the "ECU" hereinafter) 7 as a controller.

The prime mover 1 generates a drive torque to establish a driving force to propel the vehicle Ve. For example, an internal combustion engine such as a gasoline engine and a diesel engine may be adopted as the prime mover 1. An output power of the engine may be adjusted electrically, and the engine may be started and stopped electrically according to need. Given that the gasoline engine is adopted as the prime mover 1, an opening degree of a throttle valve, an amount of fuel supply or fuel injection, a commencement and a termination of ignition, an ignition timing etc. may be controlled electrically. Otherwise, given that the diesel engine is adopted as the prime mover 1, an amount of fuel injection, an injection timing, an opening degree of a throttle valve of an EGR (Exhaust Gas Recirculation) system etc. may be controlled electrically.

Further, a permanent magnet type synchronous motor and an induction motor may also be adopted as the prime mover 1. Those kinds of motors may serve not only as a motor to generate torque when driven by electricity suppled thereto, but also as a generator to generate electricity when rotated by a torque applied thereto. That is, a motor-generator may also be adopted as the prime mover 1. In this case, the motor serving as prime mover 1 is electrically connected with a battery through an inverter (neither of which are shown) so that the motor is switched between a motor and a generator by electrically controlling the prime mover 1. Specifically, the motor is operated as a motor by supplying electricity thereto from the battery, and electricity generated by the motor-generator is accumulated in the battery.

In the vehicle Ve shown in FIG. 1, the front wheels 2 serve as drive wheels, and a drive torque generated by the prime mover 1 is delivered to the front wheels 2 to establish a driving force. However, the driving force control system according to the embodiment of the present disclosure may also be applied to a rear-drive layout vehicle in which the rear wheels 3 serve as drive wheels, and a four-wheel drive layout vehicle in which all of wheels 2 and 3 are driven by the torque of the prime mover 1. In a case of using the engine as the prime mover 1, a transmission (not shown) may be arranged downstream of the prime mover 1 to deliver the output torque of the prime mover 1 to the drive wheels via the transmission.

The driving force to propel (or accelerate) the vehicle Ve is changed in accordance with a position of the accelerator pedal 4 that is manipulated by a driver. Specifically, the drive torque of the prime mover 1 is increased in accordance with an increase in depression (or an operating amount) of the accelerator pedal 4 thereby increasing the driving force to propel the vehicle Ve. By contrast, the drive torque of the prime mover 1 is reduced by returning the accelerator pedal 4. In other words, the drive torque of the prime mover 1 is reduced with a reduction in depression of the accelerator pedal 4 thereby reducing the driving force to propel the vehicle Ve. Given that the motor is adopted as the prime mover 1, a regenerative braking force derived from a regenerative torque of the motor is applied to the vehicle Ve when the accelerator pedal 4 is returned. By contrast, given that the engine is adopted as the prime mover 1, an engine braking force derived from a friction torque and a pumping loss is applied to the vehicle Ve when the accelerator pedal 4 is returned.

The braking force applied to the vehicle Ve is changed by manipulating the brake pedal 5. For example, a hydraulic disc brake and a drum brake may be adopted as a brake device, and the brake device is actuated to establish a brake force by depressing the brake pedal 5. Given that a one-pedal mode is available in the vehicle Ve, the vehicle Ve may be accelerated and decelerated only by manipulating the accelerator pedal 4 in accordance with a position of the accelerator pedal 4. In this case, the brake device may be controlled in conjunction with an operation of the accelerator pedal 4.

The detector 6 collects data relating to conditions of the vehicle Ve including conditions of the accelerator pedal 4 and the brake pedal 5. Specifically, the detector 6 comprises: an accelerator position sensor 6a that detects an operating amount (or a position) of the accelerator pedal 4; a brake stroke sensor 6b that detects an operating amount (i.e., stroke or depression) of the brake pedal 5; a speed sensor 6c that detects a speed of the vehicle Ve; an acceleration sensor 6d that detects a longitudinal acceleration of the vehicle Ve; a road grade sensor 6e that detects a road grade; and a speed sensor 6f that detects a speed of an output shaft of the motor or engine. The detector 6 is electrically connected to the ECU 7 so that data collected by those sensors are transmitted to the ECU 8 in the form of an electric signal.

The ECU 7 comprises a microcomputer as its main constituent. As described, the data collected by the detector 6 is sent to the ECU 7 to control the vehicle Ve, and the ECU 7 performs calculation using the incident data transmitted from the detector 6, and data and formulas stored in advance. Calculation results are transmitted from the ECU 7 in the form of command signal.

Specifically, the ECU 7 calculates a target drive torque to be generated by the prime mover 1 and a target acceleration (or deceleration) of the vehicle Ve based on the data transmitted from the accelerator position sensor 6a, and transmits the calculated target drive torque to the prime mover 1 in the form of command signal so as to control an output power of the prime mover 1. The ECU 7 also controls the driving force to propel the vehicle Ve or the braking force to decelerate the vehicle Ve in such a manner as to achieve the target acceleration or deceleration calculated based on a state of the accelerator pedal 4 or the brake pedal 5. Although only one ECU 7 is depicted in FIG. 1, a plurality of ECUs may be arranged in the vehicle Ve to control the specific devices individually.

Thus, the target acceleration of the vehicle Ve is determined based on a position (or an operating amount) of the accelerator pedal 4, and the output torque of the prime mover 1 is controlled in such a manner as to achieve the target acceleration. For example, the target acceleration is determined temporarily in accordance with a speed of the vehicle Ve with reference to a map shown in FIG. 2 that is stored in the ECU 7. However, if the accelerator pedal 4 is depressed abruptly at a speed higher than a predetermined level, a desired acceleration may not be achieved due to inevitable delay. In order to certainly establish the acceleration demanded by the driver, according to the exemplary embodiment of the present disclosure, a correction amount of the target acceleration is calculated based on an operation of the accelerator pedal 4 when a relatively large acceleration is demanded by the driver, and the driving force generated by the prime mover 1 to propel the vehicle Ve is controlled in such a manner as to achieve the target acceleration corrected by the calculated correction amount.

Figure 2:
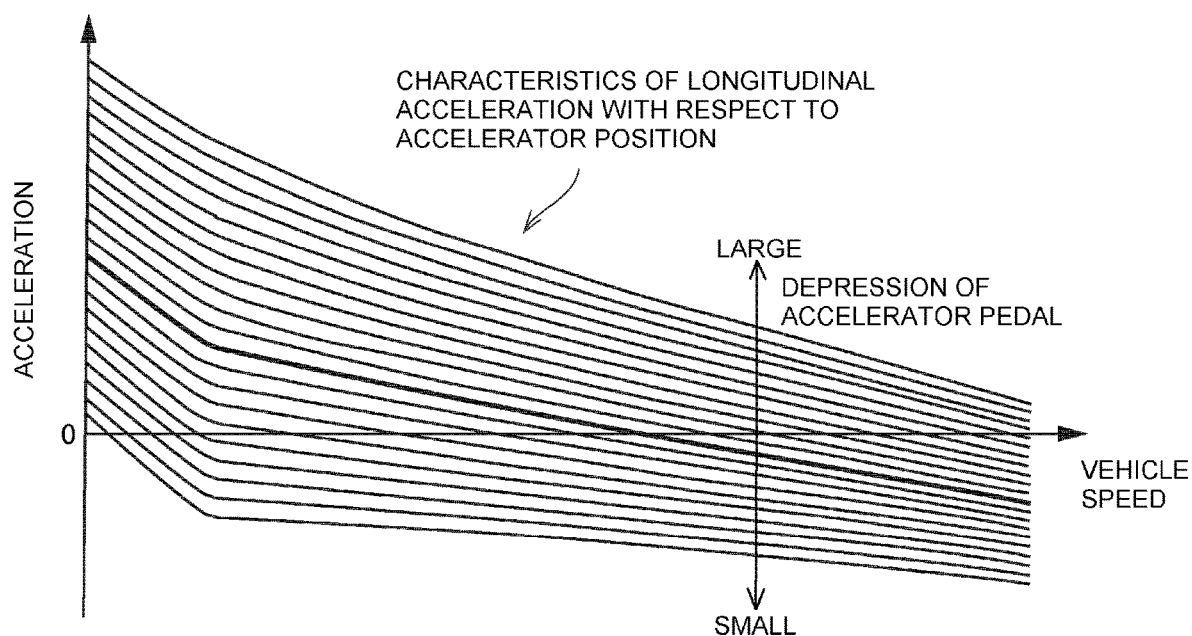
FIG. 2 is a map determining a basic target acceleration with respect to a position of an accelerator pedal.
Figure 3:
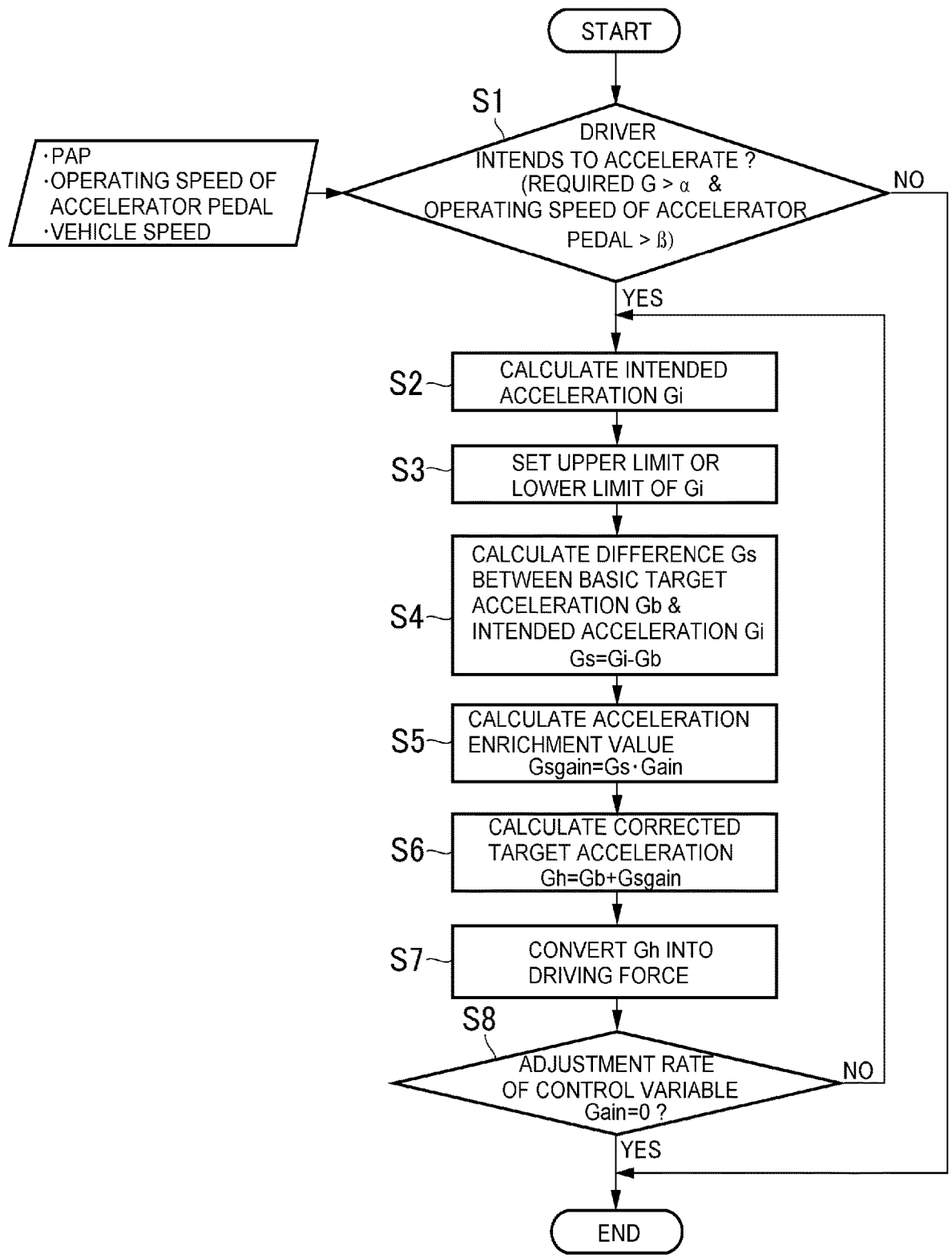
FIG. 3 is a flowchart showing one example of a routine executed by the drive force control system according to the exemplary embodiment of the present disclosure.

To this end, the ECU 7 is configured to execute a routine shown in FIG. 3. At step S1, it is determined whether the driver intends to accelerate the vehicle Ve. Specifically, it is determined whether a required acceleration G is greater than a predetermined value a, and whether an operating speed of the accelerator pedal 4 is faster than a predetermined speed ß. As described, the required acceleration G as a target acceleration is calculated based on a position of the accelerator pedal 4 (referred to as "pap" in FIG. 3) and a current speed of the vehicle Ve with reference to the map shown in FIG. 2. The required acceleration G thus calculated with reference to the map shown in FIG. 2 is a so-called static acceleration, and will be employed as a basic target acceleration Gb at the subsequent steps. If the required acceleration G is less than the predetermined value a, or if the operating speed of the accelerator pedal 4 is slower than the predetermined speed ß so that the answer of step S1 is NO, the ECU 7 determines that the driver does not intend to accelerate the vehicle Ve, and the routine returns.

By contrast, if the required acceleration G is greater than the predetermined value a and the operating speed of the accelerator pedal 4 is faster than the predetermined speed ß so that the answer of step S1 is YES, the ECU 7 determines that the driver intends to accelerate the vehicle Ve. In this case, in order to enhance the acceleration, the routine progresses to step S2 to calculate an intended acceleration Gi demanded by the driver. As described, the required acceleration G is determined temporarily based on a position of the accelerator pedal 4 and a speed of the vehicle Ve. On the other hand, the intended acceleration Gi is calculated further based on a dynamic parameter such as an operating speed of the accelerator pedal 4, in addition to the position of the accelerator pedal 4 and the speed of the vehicle Ve. That is, the intended acceleration Gi is calculated taking into account the intension of the driver to accelerate the vehicle Ve.

At step S3, an upper limit value or a lower limit value of the intended acceleration Gi is calculated. For example, if the intended acceleration Gi calculated at step S2 is greater than a maximum acceleration Gmax governed by a structure of the vehicle Ve, the intended acceleration Gi will be corrected to the maximum acceleration Gmax. By contrast, if the intended acceleration Gi calculated at step S2 is equal to or less than the maximum acceleration Gmax, the intended acceleration Gi will not be corrected and maintained to the value calculated at step S2. Here, the basic target acceleration Gb calculated at step S1 corresponds to the lower limit value of the intended acceleration Gi. That is, in principle, the intended acceleration Gi will not be restricted to the lower limit value when accelerating the vehicle Ve.

At step S4, a difference Gs (=Gi−Gb) between the basic target acceleration Gb and the intended acceleration Gi is calculated. Then, at step S5, an acceleration enrichment value Gsgain (=Gs·Gain) is calculated by multiplying the difference Gs by a predetermined control gain Gain as an adjustment rate of a control variable of the prime mover 1 that generates the driving force. The control gain Gain is obtained with reference to an after-mentioned dedicated map.

At step S6, a corrected target acceleration Gh is calculated by adding the acceleration enrichment value Gsgain calculated at step S5 to the basic target acceleration Gb as expressed as:

$Gh = Gb + Gsgain.$

That is, the basic target acceleration Gb is corrected to be increased by the acceleration enrichment value Gsgain. The corrected target acceleration Gh thus calculated at step S6 will be employed as a final value of the required acceleration G.

At step S7, the corrected target acceleration Gh is converted into a target driving force taking into consideration a weight of the vehicle Ve, a gear ratio, a diameter of each tire, a running resistance etc., and the vehicle Ve is propelled by the target driving force thus calculated so as to achieve the corrected target acceleration Gh.

Thereafter, it is determined at step S8 whether the control gain Gain is reduced to zero. If the control gain Gain has been reduced to zero so that the answer of step S8 is YES, the routine returns. As a result, an acceleration enrichment control is terminated, and the acceleration will be controlled based on the basic target acceleration Gb. By contrast, if the control gain Gain has not yet been reduced to zero so that the answer of step S8 is NO, such determination at step S8 will be repeated until the control gain Gain is reduced to zero.

Figure 4:
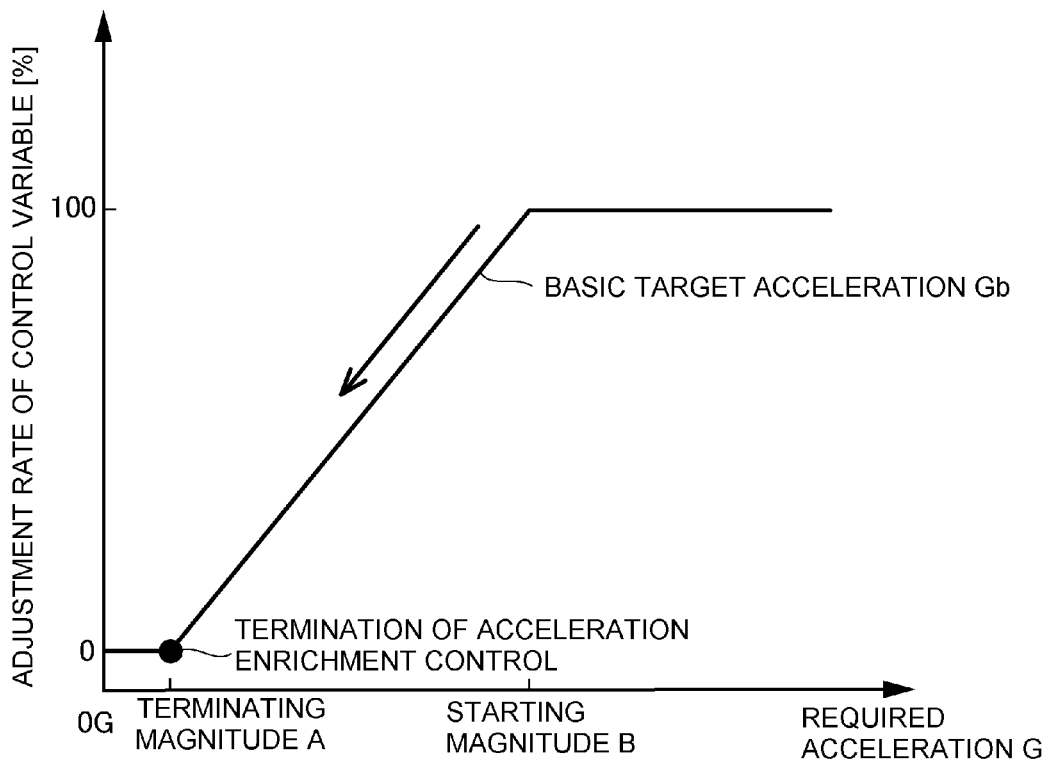
FIG. 4 is a map determining an adjustment rate of a control variable (i.e., a control gain)

Here will be explained the procedures of determining the control gain Gain with reference to FIG. 4. As shown in FIG. 4, the control gain Gain as the adjustment rate of a control variable of the prime mover 1 varies from 0 to 100% in accordance with the required acceleration G. Specifically, the adjustment rate of the control variable is increased to 100% thereby increasing the control gain Gain to a maximum gain when the ECU 7 determines that the driver intends to accelerate the vehicle Ve. That is, when the required acceleration G exceeds the predetermined value a and the operating speed of the accelerator pedal 4 exceeds the predetermined speed ß, the adjustment rate is increased to 100% to enhance the acceleration of the vehicle Ve. The adjustment rate of the control variable starts to be reduced when the required acceleration G decreases to a starting magnitude B at which an adjustment rate reducing control is commenced. Eventually, the adjustment rate of the control variable is reduced to 0% when the required acceleration G decreases to a terminating magnitude A which is immediately before the accelerator pedal 4 is returned to an initial position. Consequently, the corrected target acceleration Gh is reduced to the basic target acceleration Gb so that the acceleration enrichment control is terminated. That is, the adjustment rate of the control variable is reduced to 0% when the ECU 7 determines that the driver no longer intends to accelerate the vehicle Ve. As a result, the control gain Gain is reduced to a minimum gain. Given that the required acceleration G is about to zero, the vehicle Ve cruises in most cases while maintaining a current position of the accelerator pedal. In this situation, if the target acceleration is shifted from the corrected target acceleration Gh to the basic target acceleration Gb when the acceleration of the vehicle Ve is around zero, a jerk of the acceleration would be changed significantly. In order to avoid such significant change in the jerk, according to the exemplary embodiment of the present disclosure, the target acceleration is returned from the corrected target acceleration Gh to the basic target acceleration Gb at the terminating magnitude A just before the required acceleration G is reduced to zero. According to the exemplary embodiment of the present disclosure, therefore, the acceleration of the vehicle Ve will not be changed significantly and stepwise when the corrected target acceleration Gh is reduced to the basic target acceleration Gb.

Figure 5:
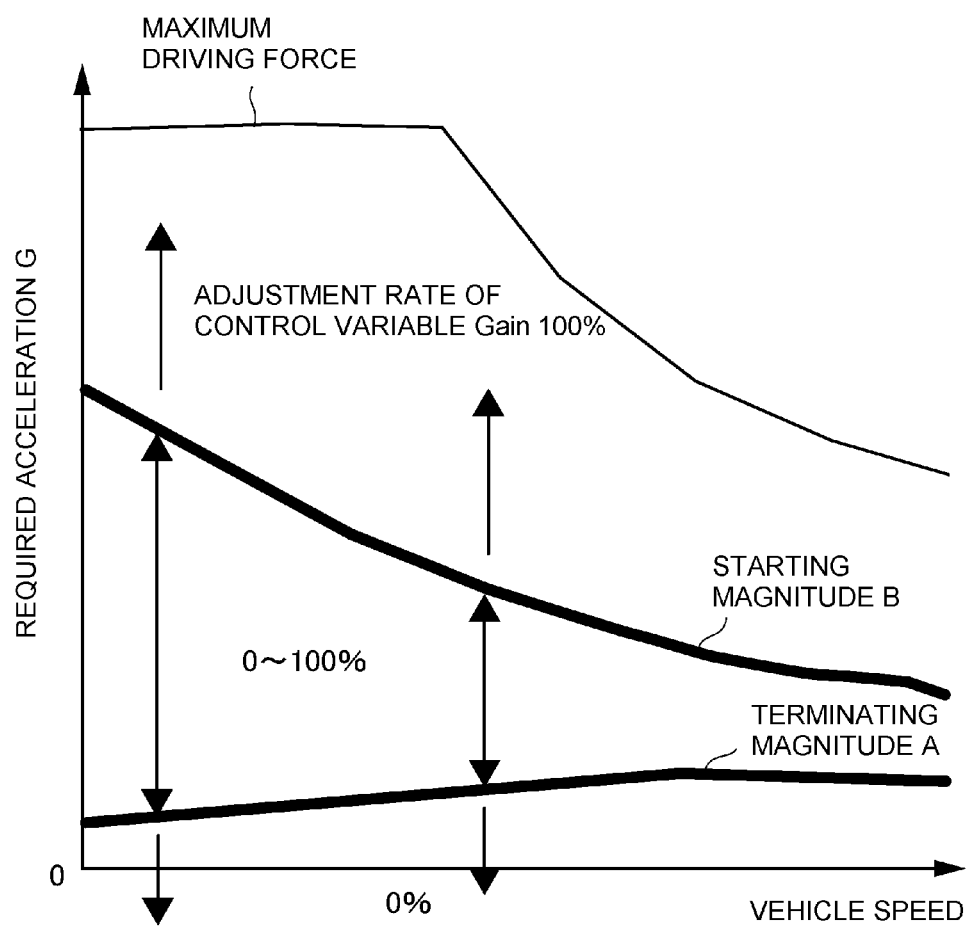
FIG. 5 is a map determining a terminating magnitude and a starting magnitude of acceleration.

As indicated in FIG. 5, the terminating magnitude A and the starting magnitude B of the acceleration are determined based on the required acceleration G and the speed of the vehicle Ve. In principle, a change in acceleration becomes difficult to be sensed with an increasing in the speed of the vehicle Ve. Therefore, the terminating magnitude A is increased mildly with an increase in the speed of the vehicle Ve. Whereas, during propulsion at a high speed, the acceleration is rarely increased. Therefore, the starting magnitude B is reduced with an increase in the speed of the vehicle Ve. Accordingly, when the required acceleration G is the terminating magnitude A or less, the adjustment rate of the control variable is reduced to 0%. By contrast, when the required acceleration G is the starting magnitude B or greater, the adjustment rate of the control variable is increased to 100%. During a change in the required acceleration G between the terminating magnitude A and the starting magnitude B, the adjustment rate of the control variable is changed continuously with the change in the required acceleration G.

Figure 6:
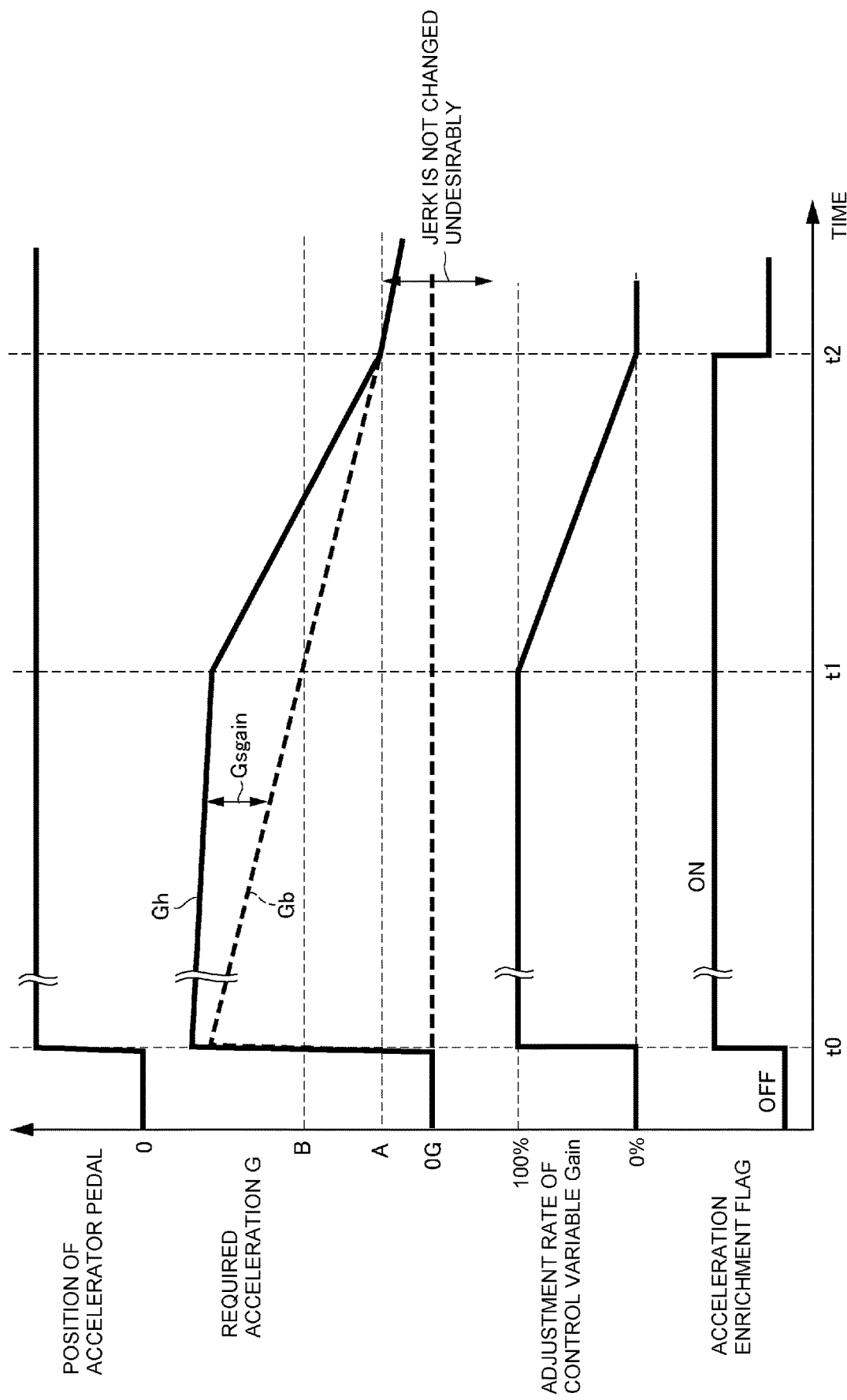
FIG. 6 is a time chart showing a first example of temporal changes in the target acceleration and the adjustment rate of the control variable during execution of the routine shown in FIG. 3.

Next, a first example of a temporal change in the adjustment rate of the control variable will be explained with reference to FIG. 6. Specifically, FIG. 6 shows an example in which the accelerator pedal 4 is depressed to accelerate the vehicle Ve, and then maintained to a predetermined position.

At point t0, the accelerator pedal 4 is depressed at a rate faster than the predetermined speed ß so that the required acceleration G is increased to the predetermined value a or greater. Consequently, an acceleration enrichment flag is turned on to commence the acceleration enrichment control from point t0, and the adjustment rate of the control variable is increased to 100%.

In this situation, the basic target acceleration Gb indicated by the dashed line is reduced from point t0 with an increase in the speed of the vehicle Ve. Then, when the basic target acceleration Gb falls to the starting magnitude B at point t1, the adjustment rate of the control variable starts to be reduced so that the acceleration enrichment value Gsgain is reduced from point t1. Consequently, the corrected target acceleration Gh indicated by the solid line starts to be reduced from point t1.

Eventually, when the basic target acceleration Gb is further reduced to the terminating magnitude A at point t2, the adjustment rate of the control variable is reduced to 0%. Consequently, the acceleration enrichment flag is turned off at point t2. As can be seen from FIG. 6, the adjustment rate of the control variable is reduced to 0% when the corrected target acceleration Gh is reduced to the basic target acceleration Gb. After point t2, the required acceleration G as the target acceleration is reduced at a same rate as a reduction rate of the basic target acceleration Gb. According to the example shown in FIG. 6, therefore, the acceleration of the vehicle Ve will not be reduced stepwise even when the acceleration enrichment control is terminated.

Eventually, the required acceleration G is further reduced close to zero and the vehicle Ve starts coasting. In this situation, since the target acceleration has already been shifted to the basic target acceleration Gb, the jerk of the acceleration will not be changed. In other words, since the acceleration enrichment control has already been terminated before the required acceleration G is reduced to zero, the acceleration of the vehicle Ve will not be reduced stepwise by an undesirable change in the jerk.

Figure 7:
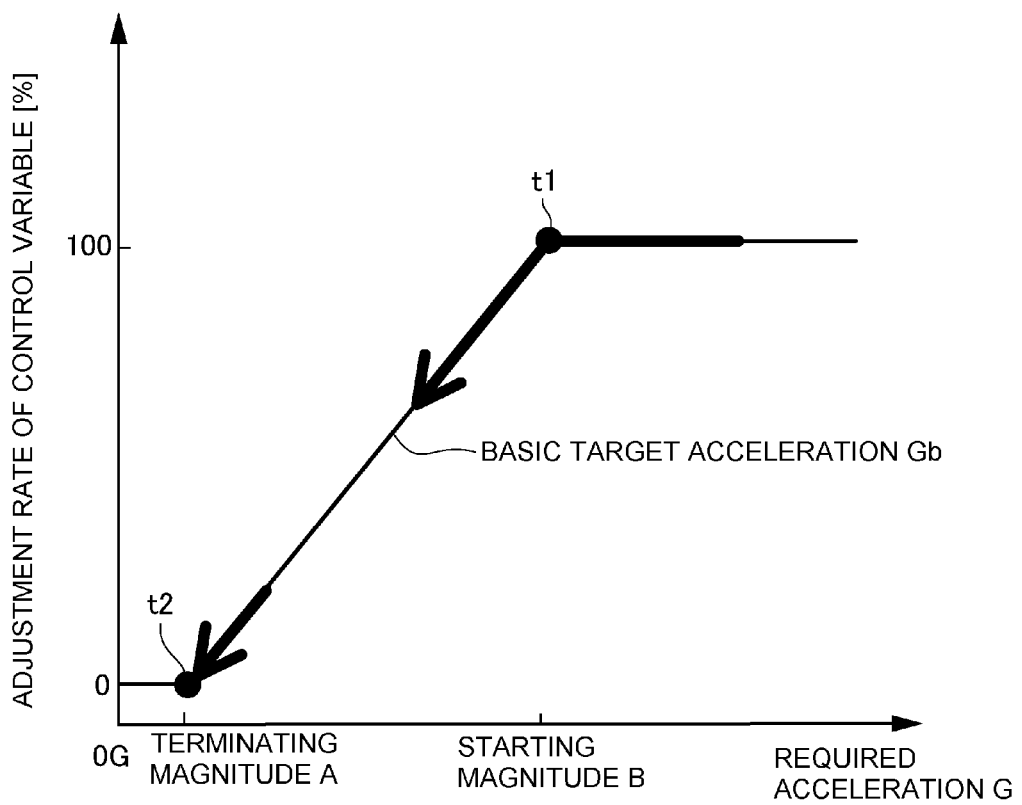
FIG. 7 is a graph showing a temporal change in the adjustment rate of the control variable during the first example shown in FIG. 6.
Figure 8:
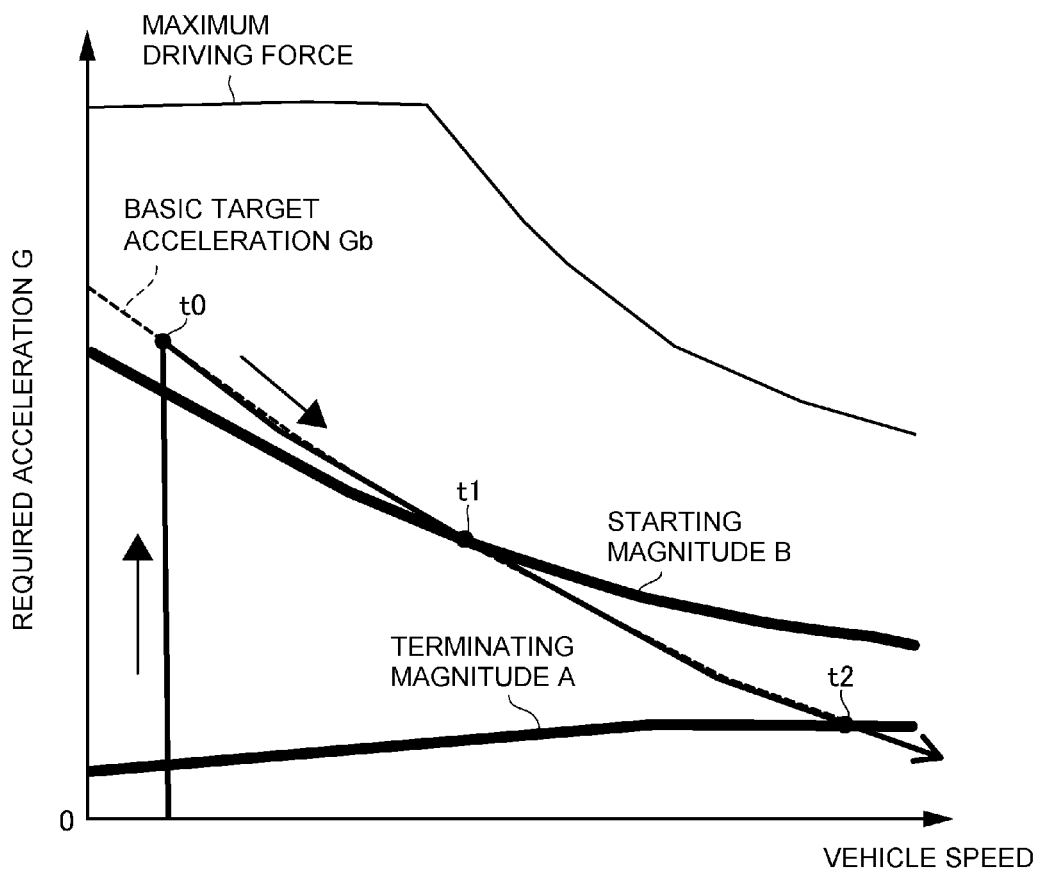
FIG. 8 is a graph showing a temporal change in the required acceleration during the first example shown in FIG. 6.

A temporal change in the control gain Gain as the adjustment rate of a control variable of the prime mover 1 in the example shown in FIG. 6 will be explained in more detail with reference to FIG. 7. As indicated by the arrow in FIG. 7, the adjustment rate of the control variable is 100% at point t1, and starts to be reduced from point t1. Eventually, the adjustment rate of the control variable is reduced to 0% at point t2. A temporal change in the required acceleration G in the example shown in FIG. 6 will be explained in more detail with reference to FIG. 8. In the example shown in FIG. 6, the accelerator pedal 4 is depressed at point t0 so that the required acceleration G is increased. Consequently, the acceleration enrichment control is commenced from point t0. Then, the required acceleration G decreases gradually with an increase in the speed of the vehicle Ve, and when the required acceleration G decreases to the starting magnitude B at point t1, the adjustment rate reducing control is commenced. Consequently, the corrected target acceleration Gh is reduced from point t1 with a reduction in the acceleration enrichment value Gsgain. The corrected target acceleration Gh is further reduced to the basic target acceleration Gb at point t2 which is immediately before the required acceleration G decreases to zero, and the acceleration enrichment control is terminated.

Thus, the control system according to the exemplary embodiment of the present disclosure is configured to execute the acceleration enrichment control when a large acceleration is required by the driver. Specifically, the driving force to propel the vehicle Ve is controlled based on the corrected target acceleration Gh calculated by adding the acceleration enrichment value Gsgain calculated taking account of the driver's intension to the basic target acceleration Gb. According to the exemplary embodiment of the present disclosure, therefore, the acceleration can be enhanced accurately in line with the driver's intension.

In addition, according to the exemplary embodiment of the present disclosure, the acceleration of the vehicle Ve can be controlled accurately in response to an operation of the accelerator pedal 4. As indicated in FIG. 9, according to the teachings of the prior art document JP-A-2011-148342, the target acceleration is reduced from the corrected target acceleration to the basic target acceleration when the acceleration of the vehicle decreases to zero in connection with the termination of the acceleration enrichment control. According to the teachings of JP-A-2011-148342, therefore, the jerk is changed in response to the termination of the acceleration enrichment control. In this situation, although the acceleration is not changed, the driver may sense a change in the acceleration due to such change in the jerk. Consequently, the driver would operate the accelerator pedal unnecessarily while the vehicle is coasting. Whereas, according to the exemplary embodiment of the present disclosure, the target acceleration is reduced from the corrected target acceleration Gh to the basic target acceleration Gb when the acceleration of the vehicle Ve decreases to the terminating magnitude A which is greater than zero. According to the exemplary embodiment of the present disclosure, therefore, the jerk is changed before the acceleration of the vehicle Ve decreases to zero, and the acceleration further decreases smoothly toward zero at the reduction rate governed by the basic target acceleration. For this reason, the driver will not be urged to operate the accelerator pedal 4 unnecessarily when the acceleration enrichment control is terminated and the vehicle Ve starts coasting.

Turning to FIG. 10, there is shown another comparison between the prior art and the exemplary embodiment of the present disclosure. As shown in FIG. 10, according to the exemplary embodiment of the present disclosure, the acceleration enrichment value Gsgain is calculated based on the difference Gs between the basic target acceleration Gb and the intended acceleration Gi. According to the exemplary embodiment of the present disclosure, therefore, the driving force can be controlled accurately in line with the intended acceleration Gi. For example, according to the prior art, the acceleration increased by depressing the accelerator pedal is reduced abruptly in spite of maintaining the position of the accelerator pedal. That is, according to the prior art, the acceleration is reduced against the driver's will. On the other hand, according to the exemplary embodiment of the present disclosure, the acceleration increased by depressing the accelerator pedal is not reduced abruptly as long as the position of the accelerator pedal is maintained. Therefore, the acceleration can be increased sharply in line with the driver's intension even if the accelerator pedal 4 is depressed deeply at a high speed, but the acceleration will not be reduced undesirably until the adjustment rate of the control variable is reduced.

Figure 11:
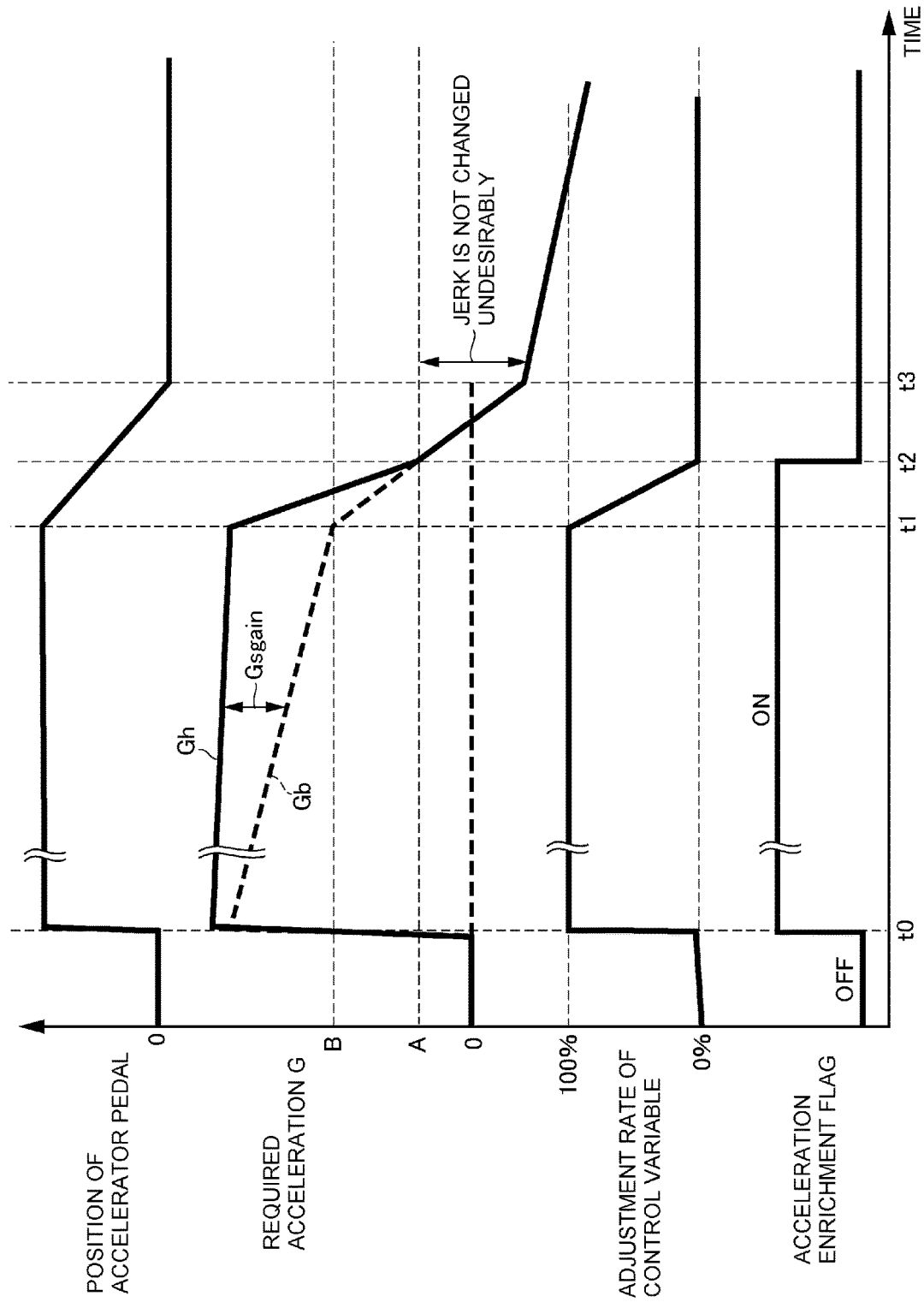
FIG. 11 is a time chart showing a second example of temporal changes in the target acceleration and the adjustment rate of the control variable during execution of the routine shown in FIG. 3.

Here will be explained other examples of a temporal change in the adjustment rate of the control variable in different situations. Turning to FIG. 11, there is shown a second example of a temporal change in the adjustment rate during execution of the routine shown in FIG. 3.

In the second example shown in FIG. 11, the accelerator pedal 4 is depressed at point t0 at a rate faster than the predetermined speed ß so that the required acceleration G is increased to the predetermined value a or greater.

Consequently, the acceleration enrichment flag is turned on to commence the acceleration enrichment control from point t0, and the adjustment rate of the control variable is increased to 100%.

In this situation, the basic target acceleration Gb is reduced from point t0 with an increase in the speed of the vehicle Ve. In the second example, the accelerator pedal 4 is returned from point t1, and the basic target acceleration Gb falls to the starting magnitude B at point t1 so that the adjustment rate of the control variable starts to be reduced. Consequently, the acceleration enrichment value Gsgain is reduced from point t1 at a rate faster than that in the first example so that the corrected target acceleration Gh is reduced from point t1 a rate faster than that in the first example.

The basic target acceleration Gb is reduced at a faster rate with a reduction in depression of the accelerator pedal 4, and when the basic target acceleration Gb is reduced to the terminating magnitude A at point t2, the adjustment rate of the control variable is reduced to 0%. Consequently, the acceleration enrichment flag is turned off at point t2. In the second example, the adjustment rate reducing control is also terminated before the required acceleration G is reduced to zero, and the required acceleration G as the target acceleration is reduced at a same rate as the reduction rate of the basic target acceleration Gb after point t2. According to the second example shown in FIG. 11, therefore, the acceleration of the vehicle Ve will also not be reduced stepwise when the acceleration enrichment control is terminated.

After point t2, the required acceleration G is further reduced close to zero and the vehicle Ve starts coasting. In this situation, since the target acceleration has already been shifted to the basic target acceleration Gb, the jerk of the acceleration will not be changed. That is, the acceleration enrichment control has already been terminated before the acceleration is reduced to zero, and hence the acceleration of the vehicle Ve will not be reduced stepwise by an undesirable change in the jerk. For this reason, the driver will not be urged to operate the accelerator pedal 4 unnecessarily when the acceleration enrichment control is terminated and the vehicle Ve starts coasting.

Thereafter, when the accelerator pedal is returned close to the initial position at point t3, the required acceleration G turns into a negative value, and consequently, the vehicle Ve is stopped.

Figure 12:
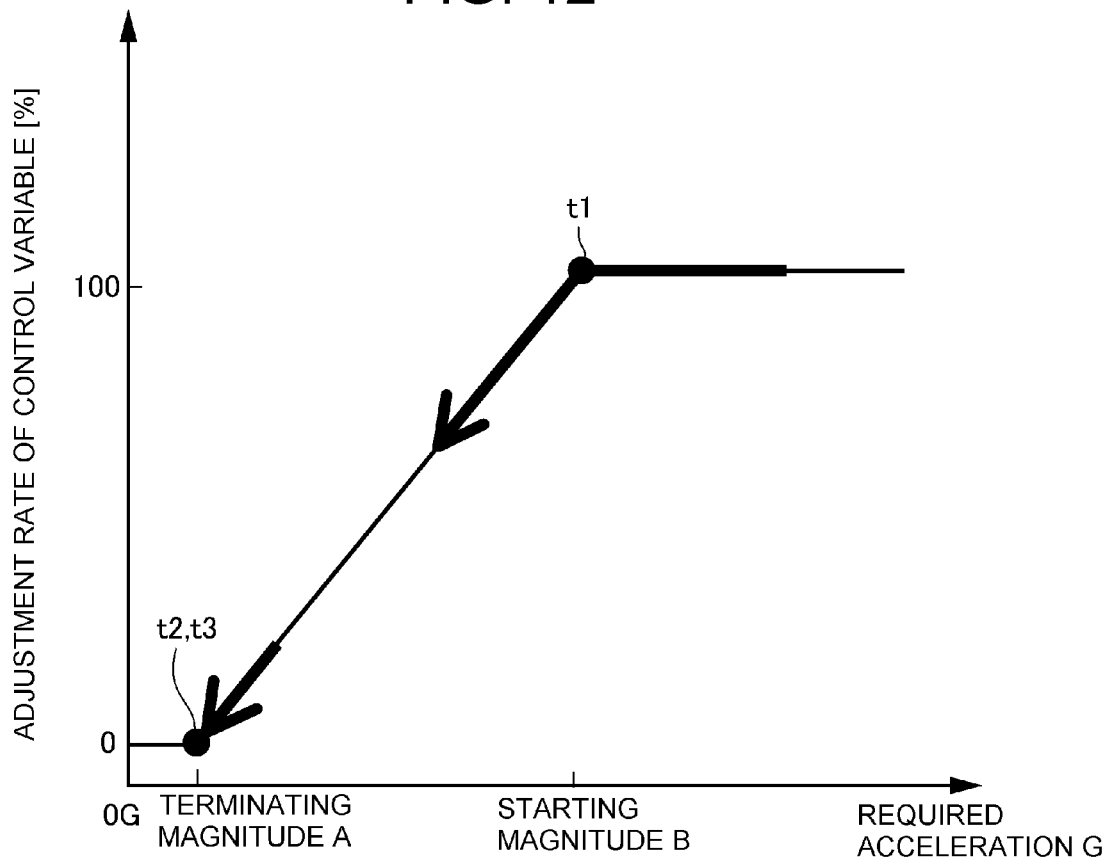
FIG. 12 is a graph showing a temporal change in the adjustment rate of the control variable during the second example shown in FIG. 11.
Figure 13:
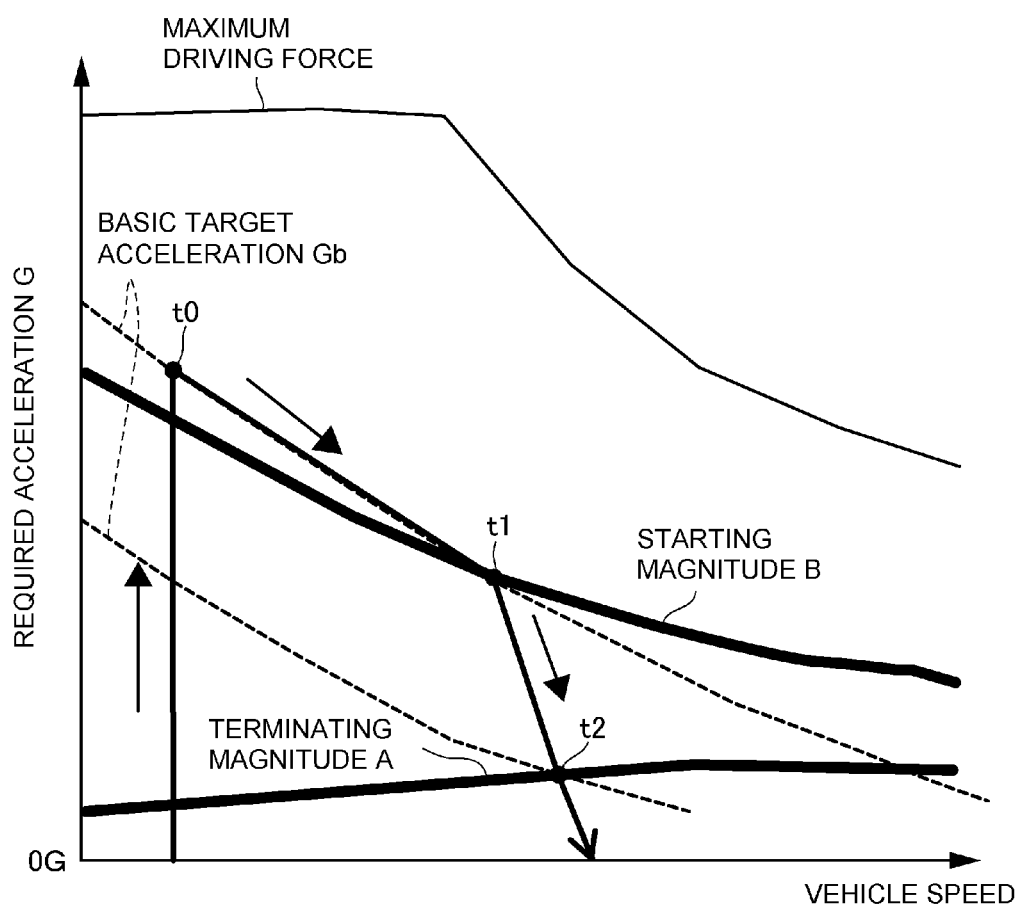
FIG. 13 is a graph showing a temporal change in the required acceleration during the second example shown in FIG. 11.

A temporal change in the control gain Gain as the adjustment rate of a control variable of the prime mover 1 in the second example shown in FIG. 11 will be explained in more detail with reference to FIG. 12. As indicated by the arrow in FIG. 12, the adjustment rate of the control variable is 100% at point t1, and starts to be reduced from point t1. Eventually, the adjustment rate of the control variable is reduced to 0% at point t2, and maintained to 0% until point t3. A temporal change in the required acceleration G in the second example shown in FIG. 11 will be explained in more detail with reference to FIG. 13. In the second example shown in FIG. 11, the accelerator pedal 4 is depressed at point t0 so that the required acceleration G is increased. Consequently, the acceleration enrichment control is commenced from point t0. Then, the required acceleration G decreases gradually with an increase in the speed of the vehicle Ve, and when the required acceleration G decreases to the starting magnitude B at point t1, the adjustment rate reducing control is commenced. Consequently, the corrected target acceleration Gh is reduced from point t1 with a reduction in the acceleration enrichment value Gsgain. The corrected target acceleration Gh is further reduced with a reduction in depression of the accelerator pedal 4 to the basic target acceleration Gb when the required acceleration G decreases to the terminating magnitude A at point t2. Consequently, the acceleration enrichment control is terminated at point t2, and then, the required acceleration G turns into the negative value.

Figure 14:
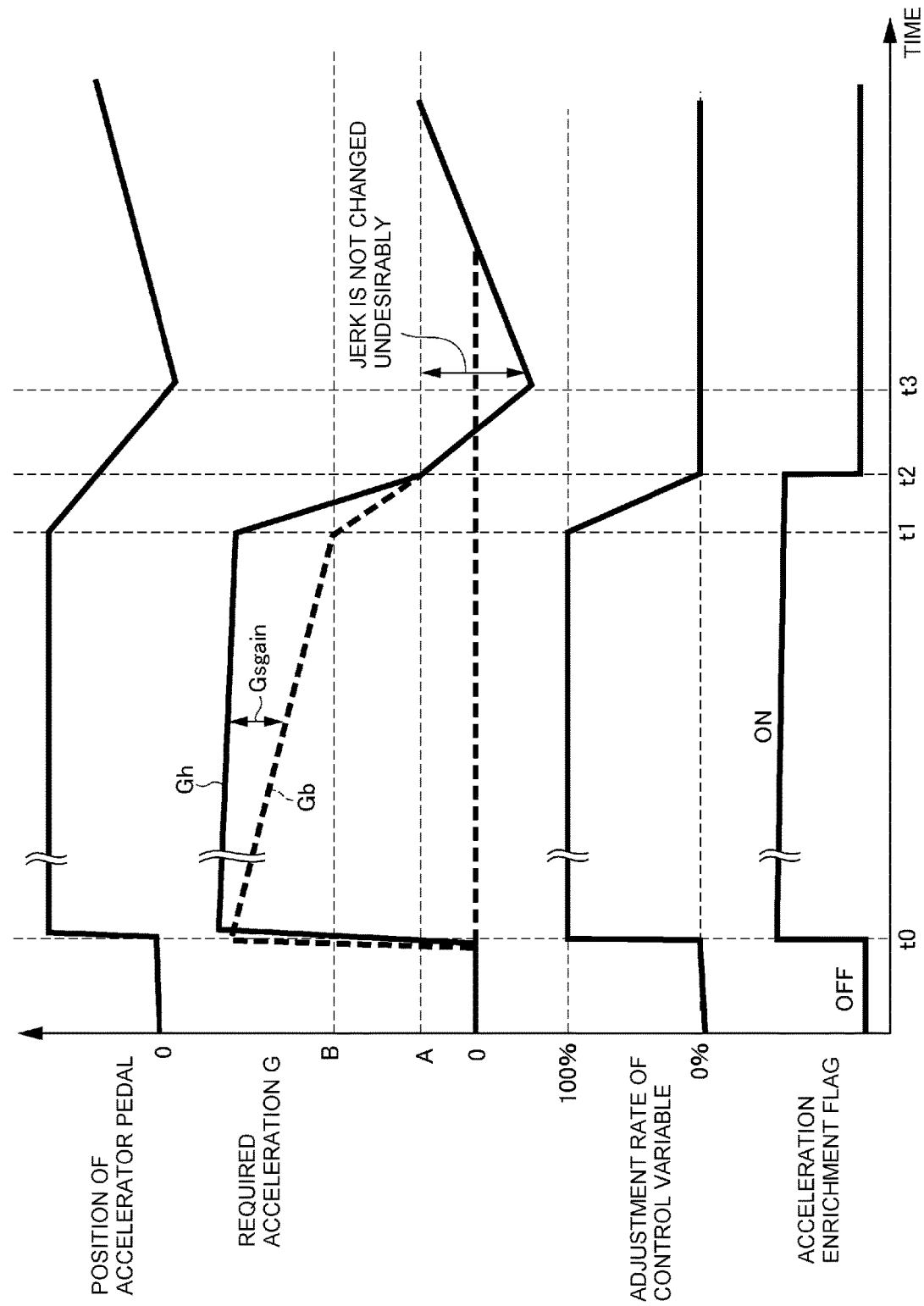
FIG. 14 is a time chart showing a third example of temporal changes in the target acceleration and the adjustment rate of the control variable during execution of the routine shown in FIG. 3.

Turning to FIG. 14, there is shown a third example of a temporal change in the adjustment rate during execution of the routine shown in FIG. 3. In the third example shown in FIG. 14, the accelerator pedal 4 is depressed at point t0 at a rate faster than the predetermined speed ß so that the required acceleration G is increased to the predetermined value a or greater. Consequently, the acceleration enrichment control is commenced from point t0. In the third example, the accelerator pedal 4 is also returned from point t1, and the corrected target acceleration Gh is also reduced to the basic target acceleration Gb at point t2. Then, the accelerator pedal 4 is returned close to the initial position at point t3 so that the required acceleration G turns into a negative value.

Thus, in the third example, the acceleration enrichment control has already been terminated before the acceleration is reduced to zero, and hence the acceleration of the vehicle Ve will not be reduced stepwise by an undesirable change in the jerk. In the third example, the accelerator pedal 4 is depressed again at point t3. In this situation, the basic target acceleration Gb is employed as the required acceleration G to increase the acceleration in response to the depression of the accelerator pedal 4. Therefore, the acceleration of the vehicle Ve can be increased naturally in response to an operation of the accelerator pedal 4.

Figure 15:
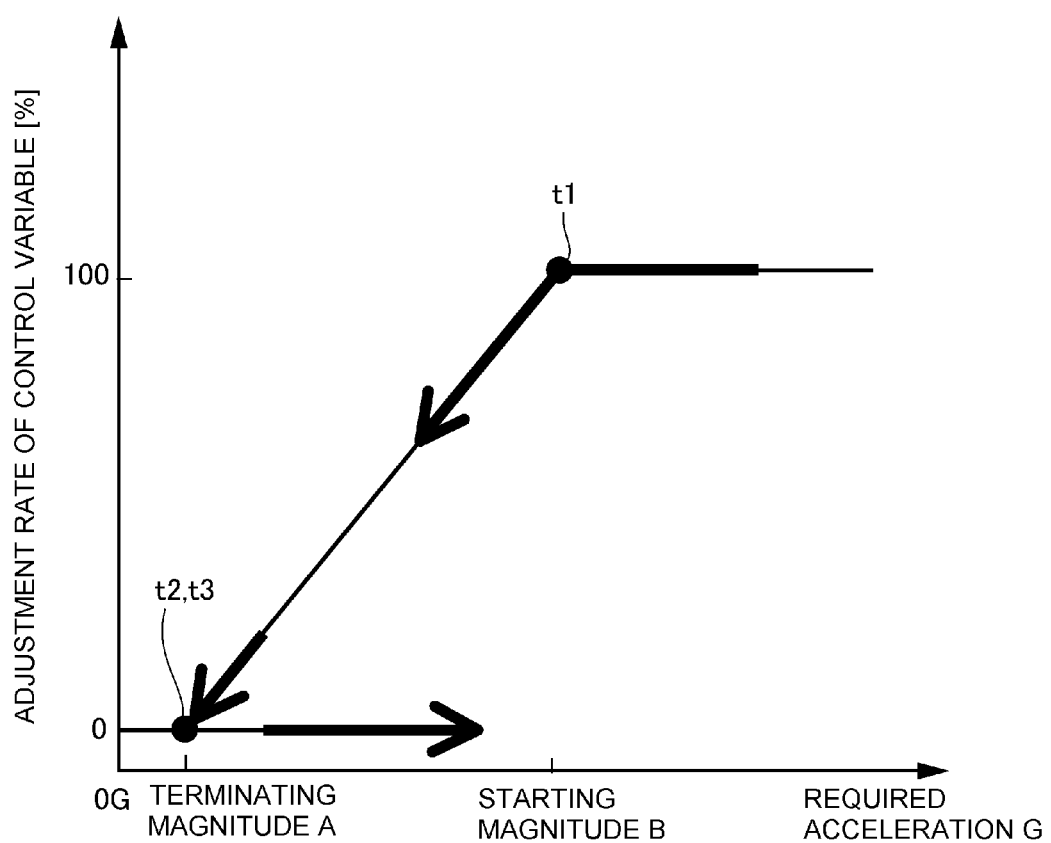
FIG. 15 is a graph showing a temporal change in the adjustment rate of the control variable during the third example shown in FIG. 14.
Figure 16:
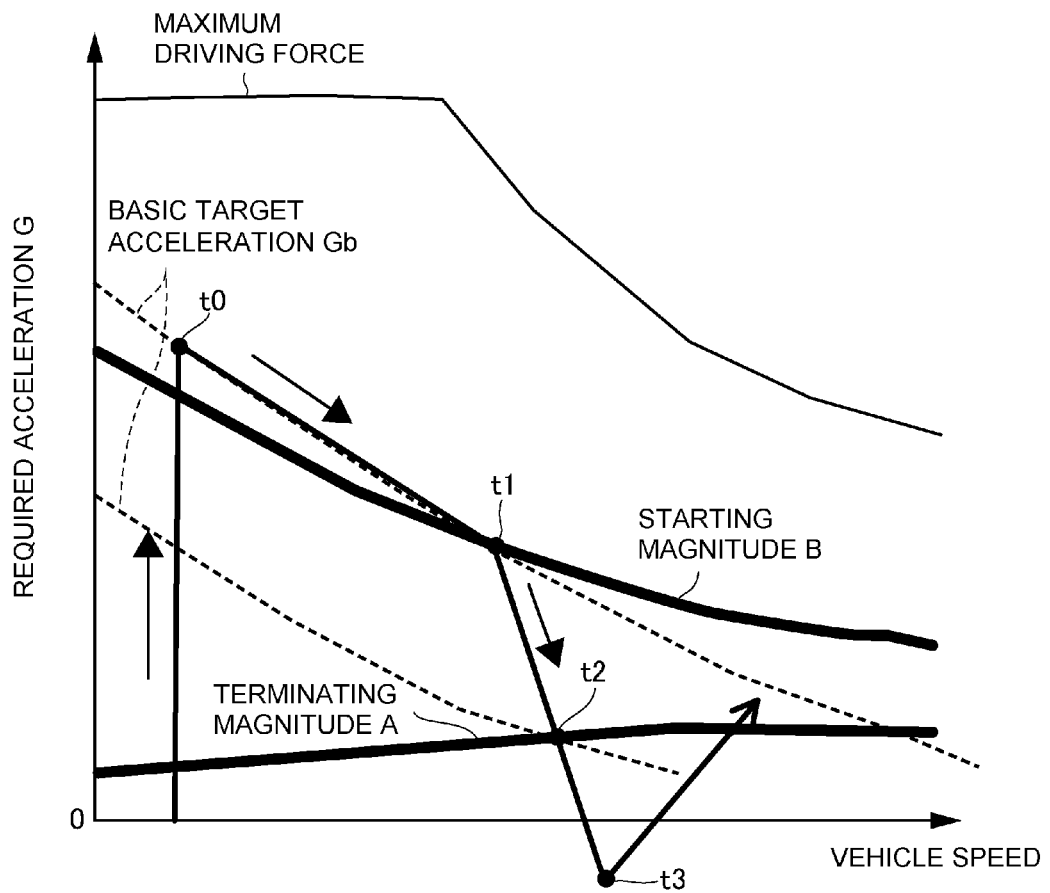
FIG. 16 is a graph showing a temporal change in the required acceleration during the third example shown in FIG. 14.

A temporal change in the control gain Gain as the adjustment rate of a control variable of the prime mover 1 in the third example shown in FIG. 14 will be explained in more detail with reference to FIG. 15. As indicated by the arrow in FIG. 15, the adjustment rate of the control variable is 100% at point t1, and starts to be reduced from point t1. Eventually, the adjustment rate of the control variable is reduced to 0% at point t2, and the required acceleration G turns into the negative value after point t2. In this situation, the required acceleration G does not exceed the predetermined value a, and the operating speed of the accelerator pedal 4 does not exceed the predetermined speed S. Therefore, the adjustment rate of the control variable is maintained to 0% after point t2. A temporal change in the required acceleration G in the third example shown in FIG. 11 will be explained in more detail with reference to FIG. 16. In the third example shown in FIG. 14, the accelerator pedal 4 is depressed at point t0 so that the required acceleration G is increased. Consequently, the acceleration enrichment control is commenced from point t0. Then, the required acceleration G decreases gradually with an increase in the speed of the vehicle Ve, and when the required acceleration G decreases to the starting magnitude B at point t1, the adjustment rate reducing control is commenced. Consequently, the corrected target acceleration Gh is reduced from point t1 with a reduction in the acceleration enrichment value Gsgain. The corrected target acceleration Gh is further reduced with a reduction in the depression of the accelerator pedal 4 to the basic target acceleration Gb when the required acceleration G decreases to the terminating magnitude A at point t2. Consequently, the acceleration enrichment control is terminated at point t2, and then, the required acceleration G turns into the negative value. Thereafter, the accelerator pedal 4 is depressed again at point t3 but the required acceleration G has not yet exceeded the predetermined value a, and the operating speed of the accelerator pedal 4 has not yet exceeded the predetermined speed S. Therefore, the required acceleration G increases mildly based on the basic target acceleration Gb in response to an increase in depression of the accelerator pedal 4.

Figure 17:
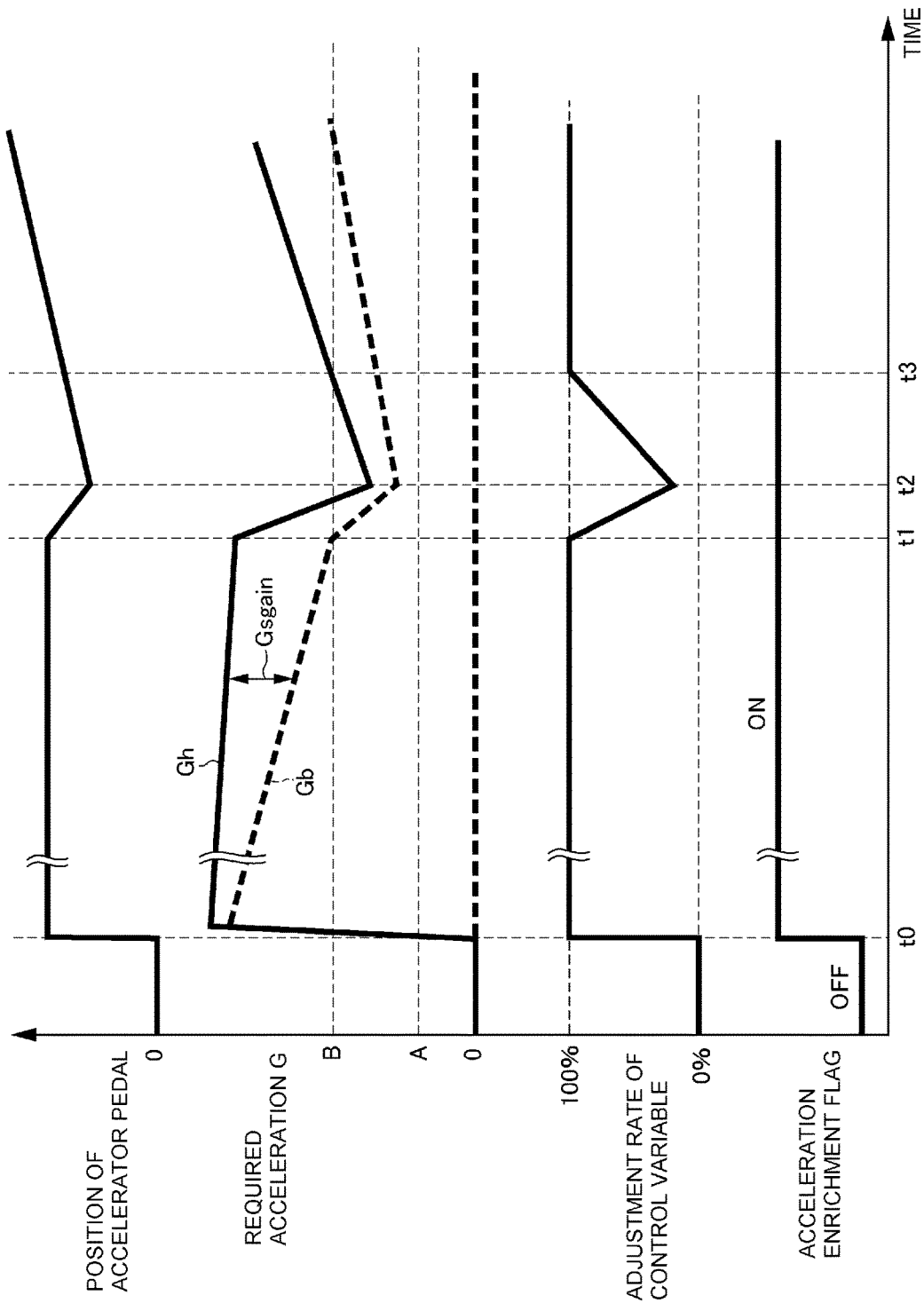
FIG. 17 is a time chart showing a fourth example of temporal changes in the target acceleration and the adjustment rate of the control variable during execution of the routine shown in FIG. 3.

Turning to FIG. 17, there is shown a fourth example of a temporal change in the adjustment rate during execution of the routine shown in FIG. 3. In the fourth example shown in FIG. 17, the accelerator pedal 4 is depressed at point t0 at a rate faster than the predetermined speed ß so that the required acceleration G is increased to the predetermined value a or greater. Consequently, the acceleration enrichment control is commenced from point t0.

The accelerator pedal 4 is also returned from point t1, and consequently, the adjustment rate of the control variable starts to be reduced so that the acceleration enrichment value Gsgain is reduced from point t1.

In the fourth example, the accelerator pedal 4 is depressed again at point t2 before the corrected target acceleration Gh is reduced to the basic target acceleration Gb. Consequently, the required acceleration G and the adjustment rate of the control variable are increased from point t2 in response to an increase in depression of the accelerator pedal 4. Eventually, the adjustment rate of the control variable being reduced is increased to 100% again at point t3, and maintained to 100% after point t3 as long as the accelerator pedal 4 is depressed. Thus, since the corrected target acceleration Gh is not reduced to the basic target acceleration Gb, the acceleration enrichment flag continues to be turned on so that the acceleration of the vehicle Ve is controlled based on the corrected target acceleration Gh after point t0.

Figure 18:
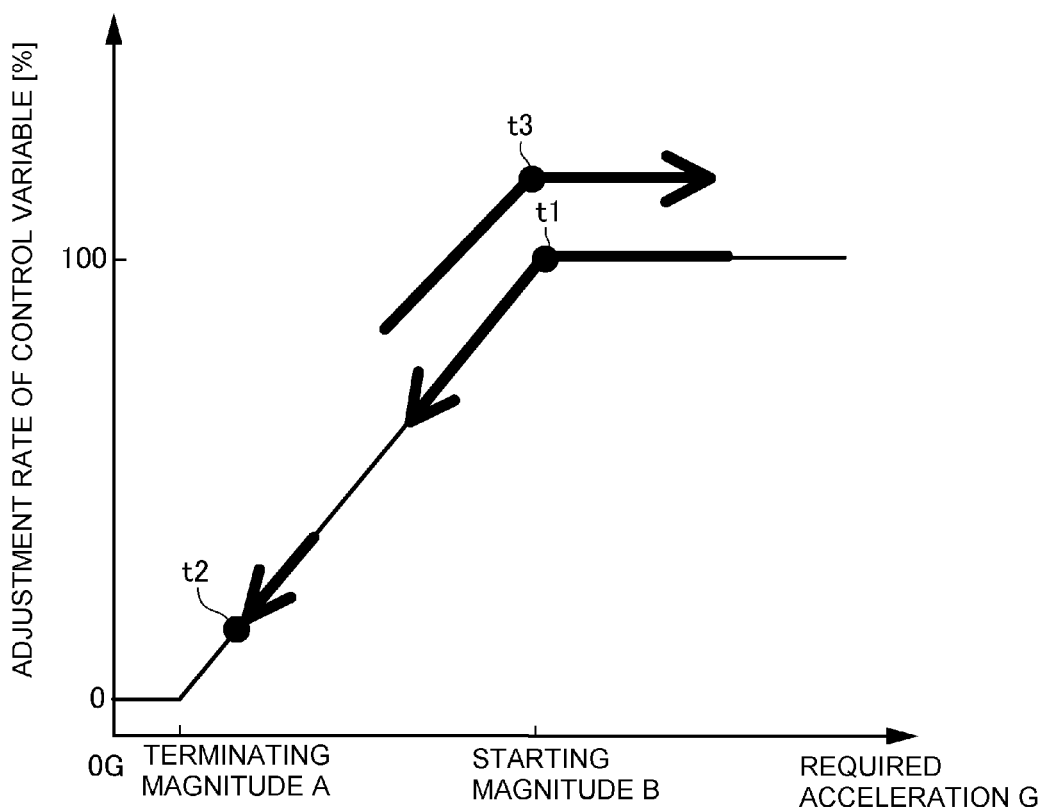
FIG. 18 is a graph showing a temporal change in the adjustment rate of the control variable during the fourth example shown in FIG. 17.
Figure 19:
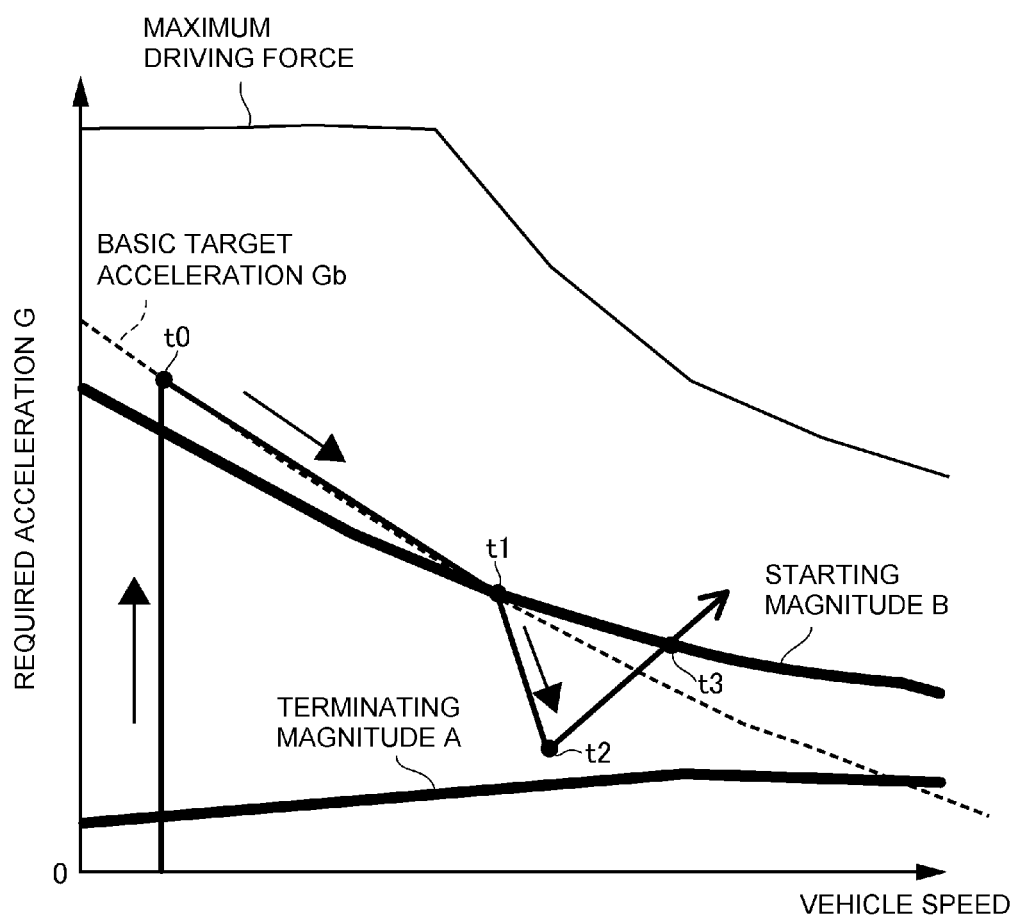
FIG. 19 is a graph showing a temporal change in the required acceleration during the fourth example shown in FIG. 17.

A temporal change in the control gain Gain as the adjustment rate of a control variable of the prime mover 1 in the fourth example shown in FIG. 17 will be explained in more detail with reference to FIG. 18. As indicated by the arrow in FIG. 18, the adjustment rate of the control variable is 100% at point t1, and starts to be reduced from point t1. Eventually, the adjustment rate of the control variable is reduced close to 0% at point t2. In this situation, the accelerator pedal 4 being returned is depressed again so that the adjustment rate of the control variable is increased to 100% again at point t3. A temporal change in the required acceleration G in the fourth example shown in FIG. 17 will be explained in more detail with reference to FIG. 19. In the fourth example shown in FIG. 14, the accelerator pedal 4 is depressed at point t0 so that the required acceleration G is increased. Consequently, the acceleration enrichment control is commenced from point t0. Then, the required acceleration G decreases gradually with an increase in the speed of the vehicle Ve, and when the required acceleration G decreases to the starting magnitude B at point t1, the adjustment rate reducing control is commenced. Consequently, the corrected target acceleration Gh is reduced from point t1 with a reduction in the acceleration enrichment value Gsgain. The accelerator pedal 4 being returned is depressed again at point t2 before the corrected target acceleration Gh is reduced to the basic target acceleration Gb. Consequently, the required acceleration G is increased from point t2 in response to an increase in depression of the accelerator pedal 4.

Next, here will be explained another example of the routine executed by the ECU 7. If the acceleration enrichment control is executed in the same manner as the case of travelling on a flat road also when travelling uphill whose road grade is steeper than a predetermined road grade, the acceleration enrichment control would be continued undesirably even if the driver does not intend to accelerate the vehicle Ve any longer. According to another example, therefore, the acceleration enrichment control is executed taking account of a road grade.

Figure 20:
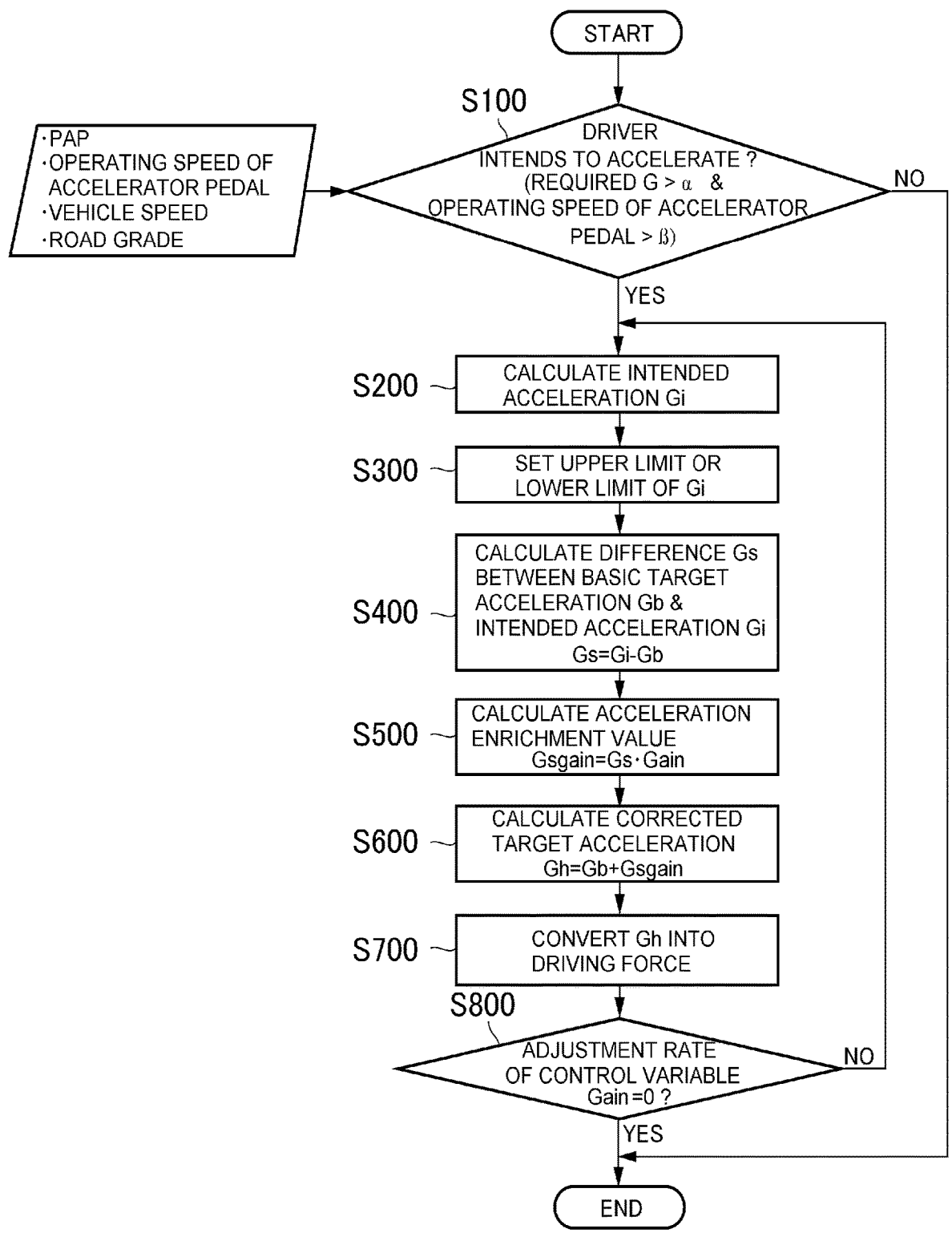
FIG. 20 is a flowchart showing another example of a routine executed by the driving force control system according to the embodiment of the present disclosure.

Turning to FIG. 20, there is shown another example of the routine executed by the ECU 7. In the following descriptions, explanations for the steps in common with those in the routine shown in FIG. 3 will be simplified.

At step S100, it is determined whether the driver intends to accelerate the vehicle Ve. Specifically, it is determined whether the required acceleration G is greater than the predetermined value a, and whether the operating speed of the accelerator pedal 4 is faster than the predetermined speed S. According to another example, the required acceleration G as a target acceleration is calculated based on a position of the accelerator pedal 4, a current speed of the vehicle Ve, and a road grade with reference to the map shown in FIG. 2. The required acceleration G thus calculated with reference to the map shown in FIG. 2 is a so-called static acceleration, and will be employed as the basic target acceleration Gb at the subsequent steps. If the required acceleration G is less than the predetermined value a, or if the operating speed of the accelerator pedal 4 is slower than the predetermined speed ß so that the answer of step S100 is NO, the ECU 7 determines that the driver does not intend to accelerate the vehicle Ve, and the routine returns.

By contrast, if the required acceleration G is greater than the predetermined value a and the operating speed of the accelerator pedal 4 is faster than the predetermined speed ß so that the answer of step S100 is YES, the ECU 7 determines that the driver intends to accelerate the vehicle Ve. In this case, in order to enhance the acceleration, the routine progresses to step S200 to calculate the intended acceleration Gi required by the driver. According to another example, the required acceleration G is determined temporarily based on a position of the accelerator pedal 4, a speed of the vehicle Ve, and a road grade. On the other hand, the intended acceleration Gi is calculated further based on a dynamic parameter such as an operating speed of the accelerator pedal 4, in addition to the position of the accelerator pedal 4, the speed of the vehicle Ve, and the road grade. That is, the intended acceleration Gi is calculated taking into account the intension of the driver to accelerate the vehicle Ve.

At step S300, the upper limit value or the lower limit value of the intended acceleration Gi is calculated. For example, if the intended acceleration Gi calculated at step S200 is greater than the maximum acceleration Gmax governed by a structure of the vehicle Ve, the intended acceleration Gi will be corrected to the maximum acceleration Gmax. By contrast, if the intended acceleration Gi calculated at step S200 is equal to or less than the maximum acceleration Gmax, the intended acceleration Gi will not be corrected and maintained to the value calculated at step S200. Here, the basic target acceleration Gb calculated at step S1 corresponds to the lower limit value of the intended acceleration Gi. According to another example, the maximum acceleration Gmax is calculated based on a maximum speed of the vehicle Ve and a road grade.

At step S400, the difference Gs (=Gi−Gb) between the basic target acceleration Gb and the intended acceleration Gi is calculated. Then, at step S500, the acceleration enrichment value Gsgain (=Gs·Gain) is calculated by the procedure explained at step S5 of the routine shown in FIG. 3.

At step S600, the corrected target acceleration Gh is calculated by adding the acceleration enrichment value Gsgain calculated at step S500 to the basic target acceleration Gb. The corrected target acceleration Gh is employed as a final value of the required acceleration G.

At step S700, the corrected target acceleration Gh is converted into the target driving force taking into consideration a weight of the vehicle Ve, a gear ratio, a diameter of each tire, a running resistance etc., and the vehicle Ve is propelled by the target driving force thus calculated so as to achieve the corrected target acceleration Gh.

Thereafter, it is determined at step S800 whether the control gain Gain (i.e., the adjustment rate of the control variable) is reduced to zero. If the control gain Gain has been reduced to zero so that the answer of step S800 is YES, the routine returns. That is, the acceleration enrichment control is terminated, and the acceleration will be controlled based on the basic target acceleration Gb. By contrast, if the control gain Gain has not yet been reduced to zero so that the answer of step S800 is NO, such determination at step S800 will be repeated until the control gain Gain is reduced to zero.

Thus, according to another example, the required acceleration G is calculated taking account of a road grade. Turning to FIG. 21, there is shown a comparison between a conventional acceleration enrichment control according to the prior art and another example shown in FIG. 20. According to the prior art, the acceleration enrichment control is executed without taking account of a road grade. In the example according to the prior art, an accelerator pedal is depressed at point t10' so that the acceleration enrichment control is commenced. Then, the road grade increases to A % from point t11' to point t12'. Consequently, a corrected target acceleration as a required acceleration falls below 0G at the grade of A % immediately after point t12', and eventually falls to a basic target acceleration at point t13'. In this situation, the driver no longer intends to accelerate the vehicle Ve at the point when the required acceleration falls below 0G at the grade of A %, however, the acceleration is still enhanced until point t13' against the driver's will.

On the other hand, according to another example shown in FIG. 20, the accelerator pedal 4 is also depressed at point t10 so that the acceleration enrichment control is commenced and the road grade also increases to A % from point t11 to point t12. According to another example shown in FIG. 20, the corrected target acceleration Gh is reduced to the basic target acceleration Gb at point t12 when the road grade increases to A %. That is, the ECU 7 determines that the driver no longer intends to accelerate the vehicle Ve when the acceleration of the vehicle Ve decreases to 0 on the uphill. In this situation, the acceleration enrichment value Gsgain is reduced in such a manner that the corrected target acceleration Gh is reduced to the basic target acceleration Gb at a greater magnitude of the acceleration decreasing while the accelerator pedal 4 is maintained to a predetermined position, compared to the case of travelling on a flat road. According to another example, therefore, the acceleration of the vehicle Ve may be controlled accurately in line with the driver's intention even when travelling uphill.

What is claimed is:

1. A driving force control system for a vehicle that is propelled by operating an accelerator pedal, the driving force control system comprising:
   a controller that calculates a target acceleration, and that transmits the calculated target acceleration in the form of a command signal, wherein the controller is configured to
   calculate, as the target acceleration, a basic target acceleration based on a position of the accelerator pedal and a speed of the vehicle,
   calculate a corrected target acceleration that is greater than the basic target acceleration and that is used as the target acceleration instead of the basic target acceleration when the basic target acceleration is greater than a predetermined value and an operating speed of the accelerator pedal is faster than a predetermined speed, and
   convert the corrected target acceleration into a target driving force to propel the vehicle so as to achieve the corrected target acceleration by generating the target driving force, wherein
   the corrected target acceleration is calculated by adding an acceleration enrichment value to the basic target acceleration,
   the acceleration enrichment value is calculated by multiplying a difference between the basic target acceleration and an intended acceleration required by a driver of the vehicle, by a predetermined control gain,
   the intended acceleration is calculated based on the position of the accelerator pedal, the speed of the vehicle, and an operating speed of the accelerator pedal,
   the predetermined control gain is determined based on (i) the basic target acceleration that is greater than the predetermined value and (ii) the speed of the vehicle,
   wherein the controller is further configured to:
   obtain a road grade;
   calculate the basic target acceleration based on the position of the accelerator pedal, the speed of the vehicle, and the road grade;
   calculate the acceleration enrichment value by multiplying a difference between the basic target acceleration and the intended acceleration calculated further based on the road grade, by the predetermined control gain; and
   reduce the acceleration enrichment value such that the corrected target acceleration approaches the basic target acceleration at a greater magnitude while the accelerator pedal is maintained at a predetermined position when travelling along an uphill road grade, as compared to travelling on a flat road grade.

2. The driving force control system as claimed in claim 1, wherein
   the controller is further configured to:
   increase the predetermined control gain to a maximum gain when the target acceleration is a first predetermined value; and
   reduce the predetermined control gain to a minimum gain when the target acceleration is a second predetermined value that is greater than zero and less than the first predetermined value.

3. The driving force control system as claimed in claim 2, wherein the predetermined control gain is changed continuously between the maximum gain and the minimum gain with a change in the target acceleration.

* * * * *